(12) United States Patent
Kimura

(10) Patent No.: US 8,036,090 B2
(45) Date of Patent: Oct. 11, 2011

(54) OPTICAL PICKUP DEVICE

(75) Inventor: Shigeharu Kimura, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 2 days.

(21) Appl. No.: 12/759,956

(22) Filed: Apr. 14, 2010

(65) Prior Publication Data

US 2010/0265809 A1    Oct. 21, 2010

(30) Foreign Application Priority Data

Apr. 20, 2009   (JP) ................................. 2009-101769

(51) Int. Cl.
  *G11B 7/135* (2006.01)
  *G11B 7/00* (2006.01)
(52) U.S. Cl. ......... 369/112.03; 369/112.01; 369/112.16; 369/112.14; 369/112.22; 369/44.23; 369/44.37
(58) Field of Classification Search ............. 369/112.01, 369/112.03, 112.14, 112.16, 112.22, 112.12, 369/94
See application file for complete search history.

(56) References Cited

U.S. PATENT DOCUMENTS

2007/0104072 A1* 5/2007 Ogata ...................... 369/112.16
2007/0268807 A1* 11/2007 Kimura et al. ........... 369/112.16
2008/0127238 A1* 5/2008 Kimura et al. ................ 720/659
2008/0267019 A1* 10/2008 Kimura et al. ............. 369/44.12

OTHER PUBLICATIONS

S. Kimura, T. Ide, Y. Anzai, K. Watanabe, T. Shintani, and E. Tatsu, "Use of grating in reading multilayer discs to reduce amount of interlayer crosstalk," Jpn. J. Appl. Phys. 48, 03A057 (2009).
K. Sano, et al., "Novel One-Beam Tracking Detection Method for Dual-Layer Blu-ray Discs", *The Japan Society of Applied Physics*, vol. 45, No. 2B, 2006, pp. 1174-1177.
H. Richter, et al., "System Apsects of Dual-Layer Phase-Change Recording With High Numerical Aperture Optics and Blue Laser", *The Japan Society of Applied Physics*, vol. 42, No. 2B, 2003, pp. 956-960.

* cited by examiner

*Primary Examiner* — Joseph Haley
*Assistant Examiner* — Nicholas Lee
(74) *Attorney, Agent, or Firm* — Antonelli, Terry, Stout & Kraus, LLP.

(57) ABSTRACT

Provided is an optical pickup device capable of stabilizing a tracking signal and a focusing signal and of preventing quality deterioration of a data signal by eliminating a multi-layer crosstalk. Of reflected lights from a multi-layer disc, a reflected light from a target layer is split into two by a light flux splitting optical system so that the reflected light is spread out toward two directions with respect to a central line, and then the split lights are condensed. In this case, a reflected light from another layer does not reach a condensing position of the reflected light from the target layer, and only the reflected light from the target layer can be detected by a detector. Accordingly, a crosstalk from the another layer is eliminated.

18 Claims, 23 Drawing Sheets

OPTICAL PICKUP DEVICE

CLAIM OF PRIORITY

The present application claims priority from Japanese patent application JP 2009-101769 filed on Apr. 20, 2009, the content of which is hereby incorporated by reference into this application.

BACKGROUND OF THE INVENTION

1. Field of the Invention

The present invention relates to an optical pickup device, and more particularly, to a readout optical system of an optical pickup device.

2. Background Art

A recording capacity of one layer in an optical disc largely depends on a wavelength of a used semiconductor laser and a numerical aperture (NA) of a used objective lens. As the wavelength of the semiconductor laser is shorter, or as the NA is larger, a recording density can be larger, and the capacity of one layer can be more increased. The mainstream of optical disc drives which are currently distributed in the market is a DVD (Digital Versatile Disc) drive which uses a red light having a wavelength in the vicinity of 650 nm and an objective lens having an NA of 0.6. Meanwhile, as an optical disc drive having a recording density larger than that of the DVD, there is also appearing in the market an optical disc drive which uses a blue-violet semiconductor laser having a light wavelength in the vicinity of 405 nm as its light source and an objective lens having an NA of 0.85. As a method of further increasing the recording density currently achieved, it is conceivable to use a laser having a shorter wavelength, but difficulties are anticipated in the development of a semiconductor laser in the ultraviolet region having a wavelength shorter than that of this blue-violet laser. In addition, with regard to providing the objective lens with a larger NA, the limit value of the NA of the objective lens in the air is 1, and hence it is also becoming difficult to improve the recording density by adjusting the NA of the objective lens.

In these circumstances, as a method of increasing the capacity of one optical disc, double-layering is carried out. Jpn. J. Appl. Phys., Vol. 42 (2003), pp. 956 to 960 introduces a technology for a double-layer phase-change disc. In a case of irradiating a double-layer optical disc with a laser light, an adjacent layer is also irradiated therewith at the same time, which causes a problem of an interlayer crosstalk. In order to reduce this problem, an interlayer spacing is made larger. Because the laser light is condensed, a layer other than an intended layer (target layer) is deviated from a condensing plane of the laser light, and hence the crosstalk can be reduced.

On the other hand, when the interlayer spacing is made larger, a problem of a spherical aberration arises. A recording layer is embedded in a polycarbonate having a refractive index different from that of the air, and the spherical aberration thereof differs depending on the depth from a disc surface. The objective lens is designed so that the spherical aberration thereof is small with respect to a specific layer. Therefore, when the focal point of the laser light is moved to another layer, the spherical aberration occurs because the distance of the focal position from the surface is different. This aberration can be normally corrected by disposing an expander lens optical system formed of two lenses or a liquid crystal element in front of the objective lens. That is, this aberration can be corrected by changing the distance between the two lenses or a phase of the liquid crystal element. However, in consideration of the compensable range of the liquid crystal element or the realization of a moving mechanism for the lenses within a small-sized optical disc drive device, it is difficult to correct a large spherical aberration.

In a case where multi-layering is to be carried out in order to further increase the capacity, a total thickness of the multi-layer is restricted by the correction limit of the spherical aberration. As the number of layers is larger, the interlayer spacing becomes narrower. For this reason, the actual optical drive device for multi-layering still has an interlayer crosstalk unsolved.

In order to reduce the above-mentioned crosstalk, ISOM/ODS'08, Technical Digest Post-deadline Papers, TD05-1.55 (2008) utilizes that, when reflected lights from the multi-layer optical disc are condensed by a lens, condensing positions of the reflected lights from the intended layer and the adjacent layer are different on the optical axis. A grating is disposed so as to include the optical axis, and a reflecting mirror is disposed on a condensing plane of the reflected light from the target layer. The reflected light from the adjacent layer irradiates the grating, and thus is attenuated. On the other hand, the reflected light from the target layer is transmitted through the space between the grating and the reflecting mirror, and thus can return to a detection system without being attenuated. This makes it possible to reduce the interlayer crosstalk.

In addition, in Jpn. J. Appl. Phys., Vol. 45, No. 2B (2006) pp. 1174 to 1177, a tracking signal is obtained by using a single beam, and a stray light from the double-layer is prevented from affecting the tracking signal. The structure is adopted, in which the light in a central part of the grating disposed in a return path is detected outside of the optical axis, whereby the stray light is prevented from entering a quadripartite detector for detecting a tracking signal which is disposed in the vicinity of the center of the optical axis.

SUMMARY OF THE INVENTION

With reference to FIG. 4, a description is given of the crosstalk of the multi-layer optical disc in the detection optical system of the optical pickup device. Here, a PP (Push-Pull) method is used for detecting a tracking error signal, and an astigmatic method is used for detecting a focus error signal. For the sake of simplicity, it is assumed that reference numeral 501 denotes a double-layer optical disc and reference numerals 511 and 512 each denote an information recording layer. As indicated by a light ray 80, a minimum beam spot position of a light ray which is emitted from an objective lens 401 to the multi-layer disc is located on the information recording layer 511, so that information is to be read out from the information recording layer 511. The optical disc 501 is rotating, and guide grooves for tracking as illustrated in FIG. 5 are formed in the information recording layer 511. FIG. 5 illustrates a part of the information recording layer, and a rotating axis is located on a far left side. The guide grooves are each irradiated with the light ray as a light spot 94. When directions perpendicular to the optical axis are defined based on the rotating axis, a direction indicated by an arrow 521 is a radial direction, and a direction indicated by an arrow 522 is a tangential direction. The focal point of the irradiation light is matched with the information recording layer 511, and hence the reflected light therefrom traces back the same optical path as that of the entering light in the opposite direction to return to the objective lens 401 of FIG. 4.

The intensity distribution of the reflected light which is measured at a position 523 after transmission through the objective lens is, for example, as illustrated in FIG. 6. In this case, only an influence of the guide grooves is taken into consideration, and a so-called ball pattern appears due to a diffraction light which is generated in a direction perpendicular to the grooves. That is, light and dark regions denoted by reference numerals 941 and 942 appear in the radial direction 521, and positions of the light and dark regions are switched with each other depending on a positional relation with the guide grooves. Next, the emitted light from the objective lens 401 of FIG. 4 is transmitted through a detection lens 402 with astigmatism, and irradiates an optical detector 51 as a light beam 801. The optical detector 51 is disposed at a position of the circle of least confusion.

FIG. 7 illustrates a state where the reflected light from the disc enters the optical detector 51. The reflected light is detected by a 2×2 matrix-shaped quadripartite detector 541 disposed in the center. The reflected light ray from the target layer irradiates the quadripartite detector 541 as a spot 811. The ball pattern of the spot 811 is as illustrated in FIG. 8. Unlike FIG. 6, the ball pattern appears in upper and lower parts, and the tangential direction and the radial direction are switched with each other. This is because a direction of the astigmatism is tilted by 45 degrees with respect to the tangential direction. In the irradiation state of the reflected light as described above, assuming that respective detectors included in the quadripartite detector 541 are named A, B, C, and D and signals of the respective detectors are named in the same manner, a tracking error signal TE is expressed as follows.

$$TE=(A+B)-(C+D)$$

In addition, assuming that a focus error signal is AF and a data signal is RF, the following expressions are obtained.

$$AF=A+C-(B+D)$$

$$RF=A+C+B+D$$

A theoretical operation of the optical pickup using the astigmatic method can be described based on the quadripartite detector. However, in actuality, it is necessary to move the objective lens in the radial direction for tracking, which causes imbalance of the tracking error signal. In order to eliminate this imbalance, the light beam is split into four or more to be detected as described in Jpn. J. Appl. Phys., Vol. 45, No. 2B (2006) pp. 1174 to 1177.

The multi-layer disc is designed so that, when the multi-layer disc is irradiated with a laser light, amounts of the reflected lights from the respective layers are substantially the same. Accordingly, a layer closer to the objective lens has a larger transmittance, which enables a layer far from the objective lens to be also irradiated with the laser light. In this condition, when the focal point of the laser light is matched with the information readout target layer 511 as illustrated in FIG. 4, a part of the laser light is transmitted as a light beam 82 through the target layer 511, is reflected by the adjacent layer 512, and becomes a stray light as indicated by, for example, a reflected light 83. The reflected light 83 returns to the objective lens 401, and enters the detection lens 402. After that, the reflected light 83 is once condensed before reaching the optical detector 51, and enters the optical detector 51 while spreading out as indicated by a light flux 804. The light flux 804 becomes a spread light spot 841 on a surface of the optical detector 541 as illustrated in FIG. 7, and covers the optical detector 541. For this reason, the light spot 841 interferes with the light spot 811 existing on the optical detector 541 at the same time. This interference is changed under the influence of change in phase of the light spot 841 which is caused by nonuniformity of the interlayer spacing. This interference fluctuates an RF signal intensity corresponding to a total amount of light, which leads to degradation in jitter of the RF signal and to deterioration in error rate at the time of reading out data. In addition, at the same time, the TE signal is also affected by this interference. In a case where the detector is misplaced or the optical disc is tilted, the fluctuations become particularly large. As a result, it becomes difficult to cause the spot to appropriately follow the guide grooves on the rotating disc. Also in a case where the adjacent layer 512 is located closer to the objective lens with respect to the readout target layer 511, the reflected light is generated from the adjacent layer, and the interference in question similarly occurs.

In order to reduce the above-mentioned interlayer crosstalk due to the influence of the adjacent layer, ISOM/ODS'08, Technical Digest Post-deadline Papers, TD05-155 (2008) uses a grating element on the optical axis in the return path of the pickup optical system. However, because the condensing lens and the reflecting mirror are used, the optical path is largely changed. Therefore, this solution is not suitable for downsizing of the optical pickup. In addition, the solution described in Jpn. J. Appl. Phys., Vol. 45, No. 2B (2006) pp. 1174 to 1177 still has the influence of the interference on the RF signal unsolved.

The present invention has an object to provide an optical pickup device in which the above-mentioned influence of the interference by another layer on the RF, TE, and AF signals is reduced.

In order to solve the above-mentioned problem, the present invention uses an optical system and a group of detectors. The optical system splits a reflected light from an intended target recording layer in a return path, and causes the reflected light to intersect the optical axis only on a condensing plane thereof. The group of detectors are disposed in a region which a stray light generated by the optical system does not enter.

The optical pickup device according to the present invention includes: a laser light source; an irradiation optical system which condenses a laser light from the laser light source onto one recording layer of a multi-layer optical information storage medium; and a detection optical system which detects a reflected light reflected by the one recording layer of the multi-layer optical information storage medium.

One detection optical system includes: a light flux splitting optical system which splits and moves the reflected light from the one recording layer to eliminate the reflected light in the vicinity of an optical axis; a reflected light condensing lens which focuses the split reflected lights; a detector which is disposed at a smallest spot position of the reflected light from the intended recording layer, within the reflected light focused by the reflected light condensing lens; and a diffraction grating which is disposed within the reflected light and splits the reflected light into a plurality of regions to cause the reflected light in each of the regions to enter a desired detector. A sensing region of the detector is provided in a region which a stray light from another layer does not enter.

Another detection optical system includes: a reflected light condensing lens which condenses the reflected light from the one recording layer onto a detector; a light flux splitting optical system which splits the reflected light from the one recording layer to both sides of an optical axis so that light fluxes obtained after splitting the reflected light do not pass through the optical axis before reaching a condensing plane formed by the reflected light condensing lens, the light flux splitting optical system being provided between the detector and the reflected light condensing lens; and a diffraction grating which is divided into a plurality of regions having different diffraction directions. A sensing region of the detector is provided in a region which is not irradiated with a reflected light from another recording layer different from the one recording layer.

The light flux splitting optical system splits the reflected light in a tangential direction, that is, a direction corresponding to a circumferential direction of the multi-layer optical information storage medium.

The diffraction grating is divided into eight regions having the different diffraction directions. The eight regions are provided symmetrically to a straight line in a radial direction and a straight line in a tangential direction, both the straight lines intersecting the optical axis. Four of the eight regions include a ball pattern and remaining four of the eight regions do not include the ball pattern.

According to the present invention, the reflected light from the another layer is prevented from entering the detector. Therefore, the influence of the reflected light from the another layer on the tracking error signal, the focus error signal, and the RF signal is eliminated, so that tracking and focusing can be stably performed. Further, the influence of the stray light on the RF signal is also eliminated, and hence the reliability of readout data is improved.

DETAILED DESCRIPTION OF THE PREFERRED EMBODIMENTS

Hereinafter, an embodiment mode of the present invention is described with reference to the accompanying drawings.

Figure 9:
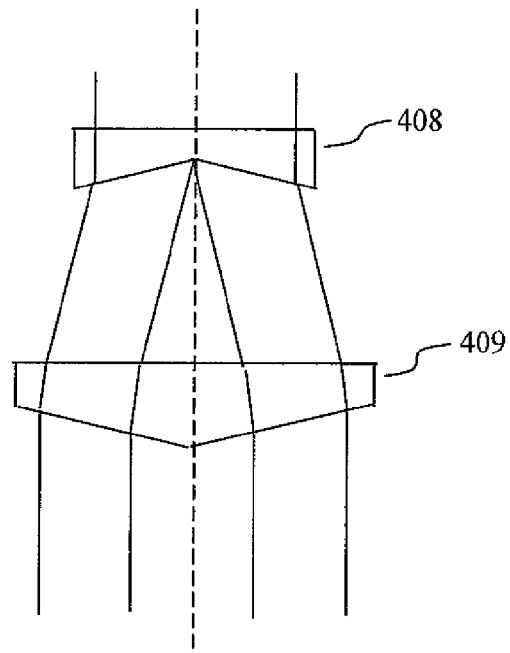
FIG. 9 is a view illustrating a light flux splitting optical system which uses two biprisms.

First, a description is given of a light flux splitting optical system for splitting a reflected light in a return path. FIG. 9 is a view illustrating an example of the light flux splitting optical system which uses two biprisms to thereby split a beam. A parallel light ray enters a first biprism 408, so that parallel light rays which travel in directions at the same angle and symmetric with respect to an optical axis are formed with a perpendicular of the optical axis being as a splitting line. A second biprism 409 changes the traveling directions of the parallel light rays at angles to the optical axis into the traveling directions parallel to the optical axis. The two biprisms are used in this manner, whereby a normal beam can be converted into split parallel light rays.

Figure 10:
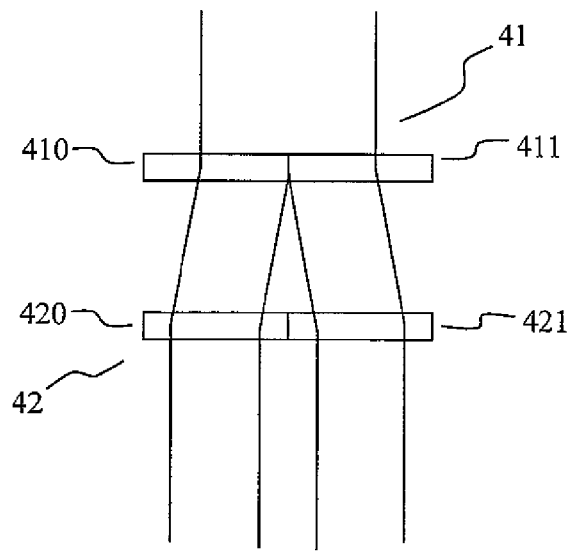
FIG. 10 is a view illustrating a light flux splitting optical system which uses two splitting diffraction gratings.
Figure 11:
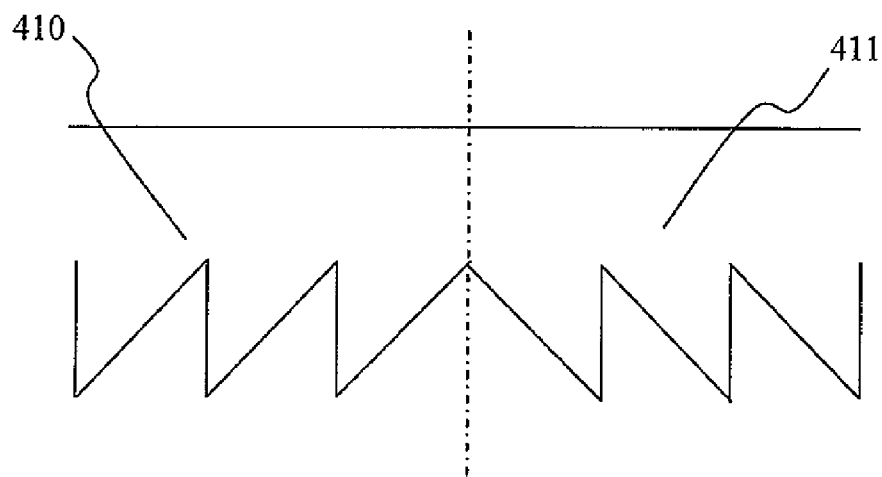
FIG. 11 is a view illustrating a cross section of one of the two diffraction gratings.
Figure 12:
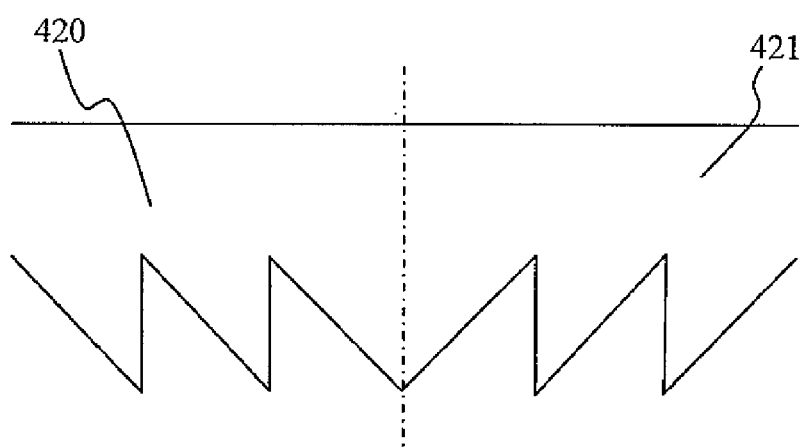
FIG. 12 is a view illustrating a cross section of another one of the two diffraction gratings.

FIG. 10 is a view illustrating an example of a light flux splitting optical system which uses transmission gratings 41 and 42 for parallel splitting. The gratings 41 and 42 each have two regions in which traveling directions of diffraction lights generated by each grating are different from each other. The two regions of each grating have the same groove direction and the same groove pitch as those of the splitting line, and further are formed into a serrated shape having a groove depth of 1/(n−1) at which a 0th-order light is not generated. n denotes the refractive index of each grating, and the gratings are assumed to be placed in the air. The 0th-order light is not generated even at a groove depth of an integral multiple of 1/(n−1). FIG. 11 illustrates the serrated shape of the grating 41. The serrated shapes of a region 410 and a region 411 are inverted to each other, and hence the light entering from above is diffracted in the directions symmetric to the optical axis. FIG. 12 illustrates the serrated shape of the grating 42. A region 421 has the same serrated shape as that of the region 410, and a region 420 has the same serrated shape as that of the region 411. Therefore, the light which is transmitted through the grating 41 becomes two beams at angles to the optical axis, and then the two beams are transmitted through the grating 42 to be spaced apart from each other and parallel to the optical axis.

Figure 13:
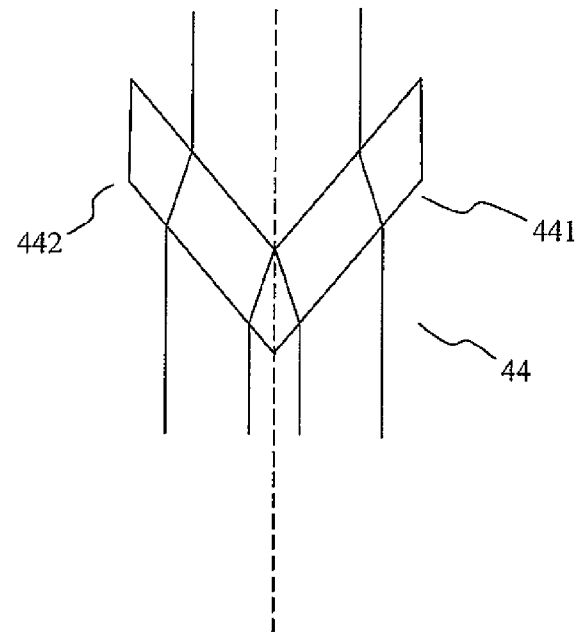
FIG. 13 is a view illustrating a light flux splitting optical system which uses two parallel flat plates.

FIG. 13 is a view illustrating an example of a light flux splitting optical system which uses parallel flat plates. A splitting flat plate element 44 includes two parallel flat plates 441 and 442. The two parallel flat plates are tilted at the same angle to the optical axis, and are located at positions symmetric to the optical axis. A ridge line formed by a joining part of the two parallel flat plates perpendicularly intersects the optical axis, and the ridge line or a valley line formed by the joining part of the parallel flat plates corresponds to a radial direction. A parallel light entering from above in FIG. 13 is split into two at a position of the valley line, and the respective split lights enter the different parallel flat plates. In a case of using transparent glass or plastic as the parallel flat plates, the refractive index thereof is larger than that of the air. Therefore, at a light incident surface, the light ray travels in directions away from a plane including the valley line and the optical axis, and becomes beams parallel to the optical axis at a light exit surface.

Figure 27:
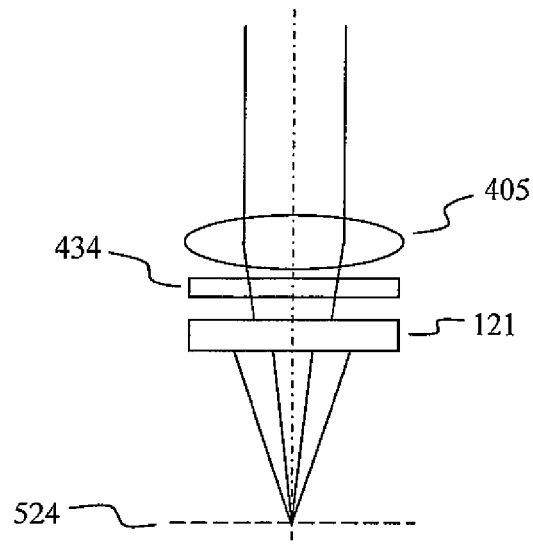
FIG. 27 is a structure view in which a light flux splitting optical system and a diffraction grating are disposed within a converging light flux.

Hereinabove, a method of splitting a light ray within a parallel light flux is described. There is also a case where a light ray is split within a converging light as illustrated in FIG. 27. In the light flux splitting optical system in this case, for example, the element in FIG. 13 is designed so as to have the light exit surface which is tilted to a larger degree than the light incident surface, whereby split reflected light fluxes from a target layer can be condensed at the same position on the optical axis. Similarly for FIG. 9 and FIG. 10 illustrating other splitting methods, an amount of bending a light flux is set to be different between the element on the light incident side and the element on the light exit side, whereby the light flux can be split and converged within the converging light. In a case of splitting within a strong converging light, an aberration occurs. In this case, the aberration is corrected by a reflected light condensing lens or the like, which enables focusing on a small spot.

Figure 14:
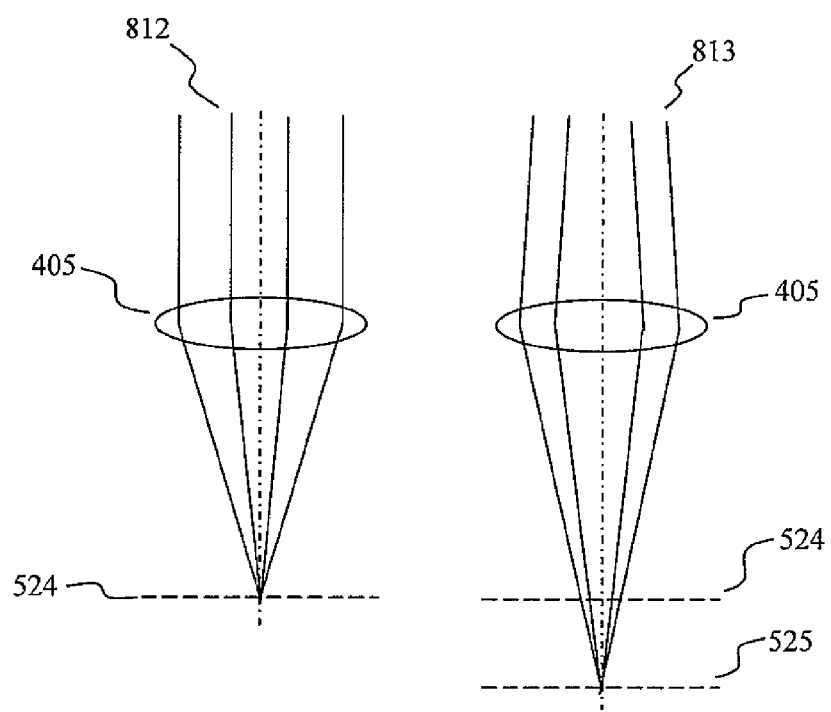
FIG. 14 is a view illustrating a condensing state of split reflected lights.
Figure 15:
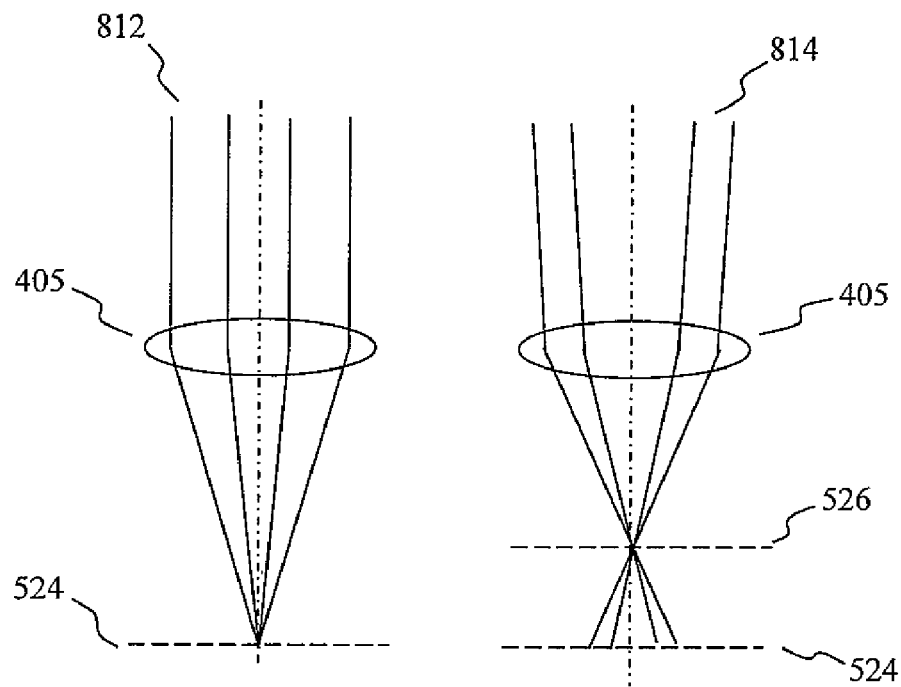
FIG. 15 is a view illustrating another condensing state of the split reflected lights.

FIGS. 14 and 15 each illustrate a state where a reflected light from a multi-layer disc is split into two and condensed by a reflected light condensing lens. For ease of description, in each of FIGS. 14 and 15, a reflected light from a target layer and a reflected light from another layer are illustrated in different views, but, in actuality, both of the reflected lights are generated at the same time and overlap each other. In a left view in each of FIGS. 14 and 15, split reflected lights 812 from the target layer are condensed by a reflected light condensing lens 405, and form the smallest spot on a condensing plane 524. A right view in FIG. 14 illustrates a state where reflected lights 813, which are from a layer located closer to an objective lens with respect to the target layer and become stray lights, are condensed by the reflected light condensing lens 405. It is assumed that the reflected lights 813 which enter the reflected light condensing lens 405 are split. Because the reflecting layer is located closer to the objective lens, the split reflected lights 813 are condensed at a position 525 which is farther than the condensing plane 524 of the reflected light from the target layer. A right view in FIG. 15 illustrates a condensing state when the reflecting layer is located farther than the target layer. Split reflected lights 814 are condensed at a position 526 which is closer to the reflected light condensing lens 405 with respect to the condensing plane 524 of the reflected light from the target layer.

Figure 16:
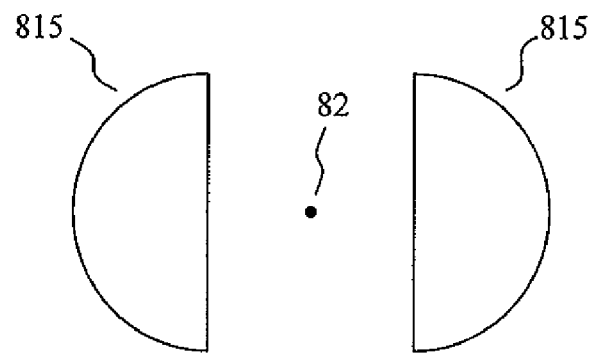
FIG. 16 is a view illustrating a light distribution on a condensing plane.
Figure 17:
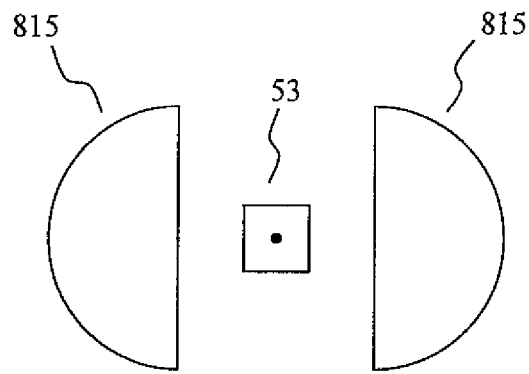
FIG. 17 is a view illustrating an arrangement of a detector which detects only a reflected light from a target layer.

FIG. 16 illustrates a light distribution on the condensing plane 524 in FIG. 14 or 15. The reflected light from the target layer is condensed as a small spot 82 in the center of the optical axis, while the reflected light from the layer other than the target layer forms a light distribution as indicated by reference numeral 815 and is split into two without irradiating the vicinity of the center of the optical axis. Accordingly, as illustrated in FIG. 17, a detector 53 is disposed in a region which is not irradiated with the split stray light, whereby the reflected light from the target layer can be detected without an influence of the stray light from the another layer.

Figure 18:
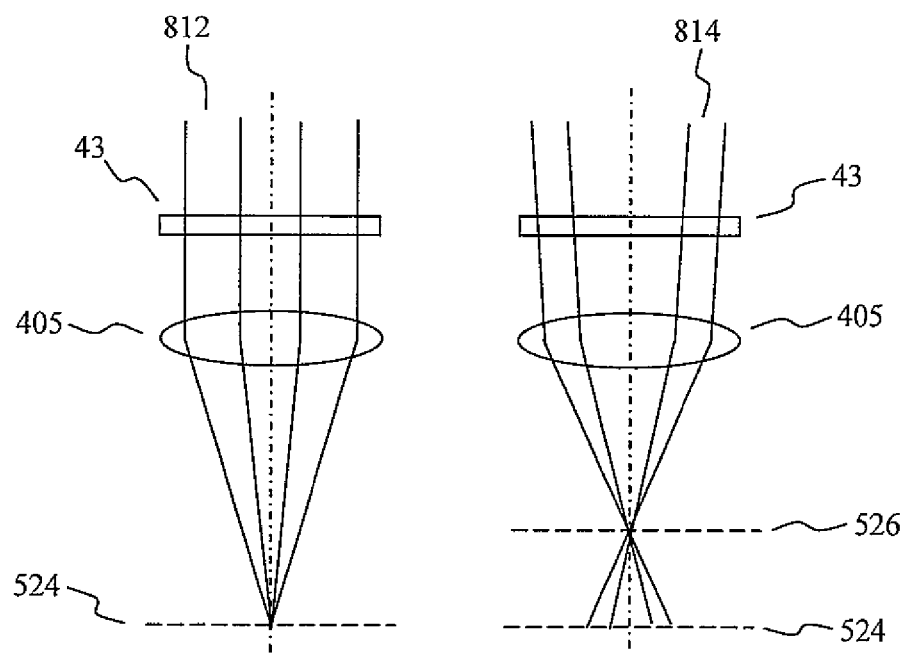
FIG. 18 is a view illustrating a state where a diffraction grating is inserted into split light fluxes.
Figure 19:
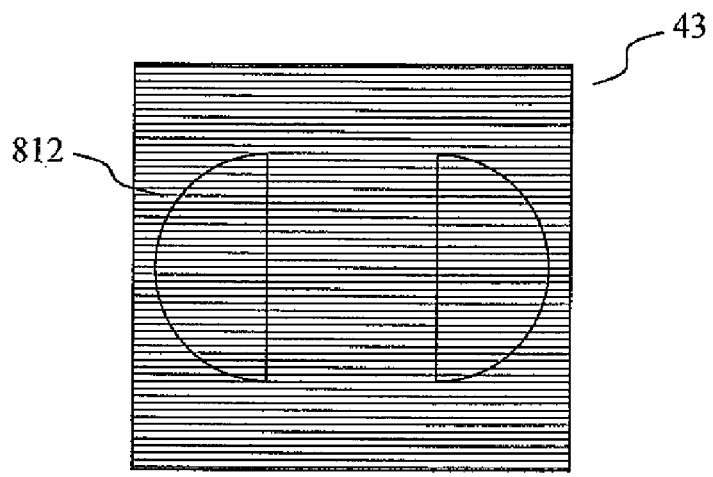
FIG. 19 is a view illustrating the diffraction grating which is inserted into the split light fluxes.
Figure 20:
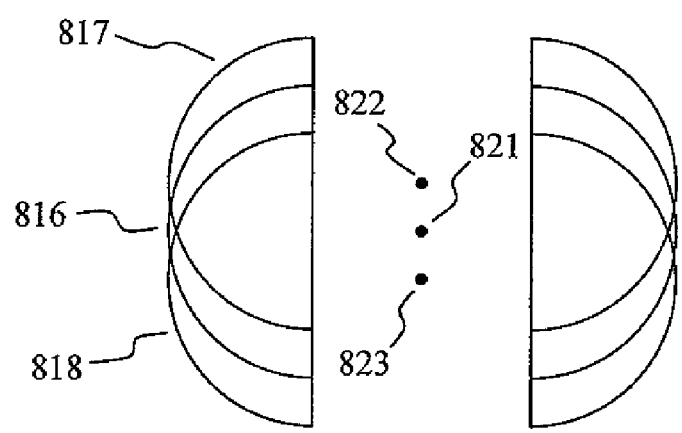
FIG. 20 is a view illustrating the light distribution on the condensing plane when the diffraction grating is inserted.
Figure 21:
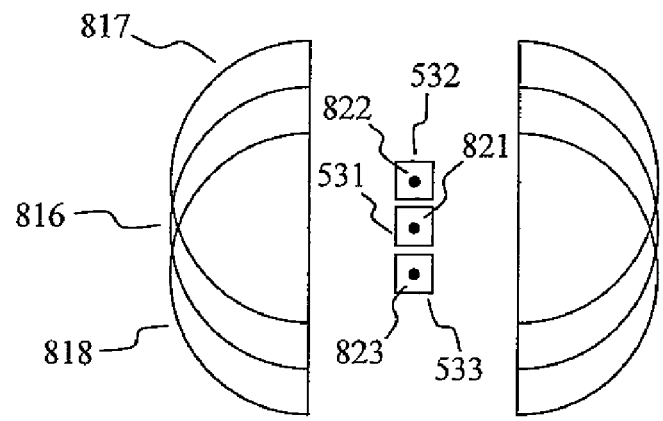
FIG. 21 is an arrangement view in which detectors are arranged in relation to the light distribution of FIG. 20.

A case as illustrated in a left view in FIG. 18 where a diffraction grating 43 is inserted at a position at which the reflected light from the target layer becomes parallel lights is examined. Lights which are split as illustrated in FIG. 19 enter the diffraction grating 43, and a groove direction of the diffraction grating is equal to a direction (lateral direction in FIG. 19) in which the reflected light is split and spread out. A right view in FIG. 18 illustrates a state where the diffraction grating 43 is inserted into the stray light from a layer farther than the target layer. The insertion of the diffraction grating 43 causes the diffraction lights of the reflected lights at the condensing position 524. In a case where the diffraction grating 43 has a rectangular grating shape, the light distribution as illustrated in FIG. 20 is obtained. A 0th order light of the reflected light from the target layer forms a spot 821, a +1st-order light thereof forms a spot 822, and a −1st-order light thereof forms a spot 823. A 0th-order diffraction light of the stray light from the farther layer forms a distribution separated into two as indicated by reference numeral 816, and ±1st-order lights thereof form distributions above and below the distribution 816 as indicated by reference numerals 817 and 818. The description of ±2nd- or higher-order lights is omitted here. In order to avoid detection of the stray light, detectors 531, 532, and 533 which are arranged in a vertical direction and detect the respective spots 822, 821, and 823 are prepared as illustrated in FIG. 21. This enables the detection without the influence of the distributions 816, 817, and 818 of the stray lights.

Figure 22:
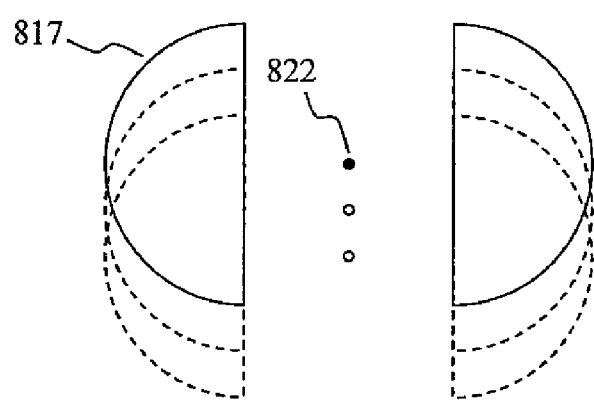
FIG. 22 is a view illustrating the light distribution on the condensing plane when a diffraction grating which generates only a +1st-order diffraction light is used.

FIG. 22 illustrates a case where grooves of the diffraction grating 43 are blazed. In this case, only the spot 822 of the +1st-order light from the target layer and the light distribution 817 of the stray light appear on the condensing plane 524. The use of the blazed diffraction grating enables a strong spot to appear at only one point on the condensing plane 524. Moreover, the spot position can be set to a desired position by changing the groove direction and the groove pitch of the diffraction grating.

Figure 23:
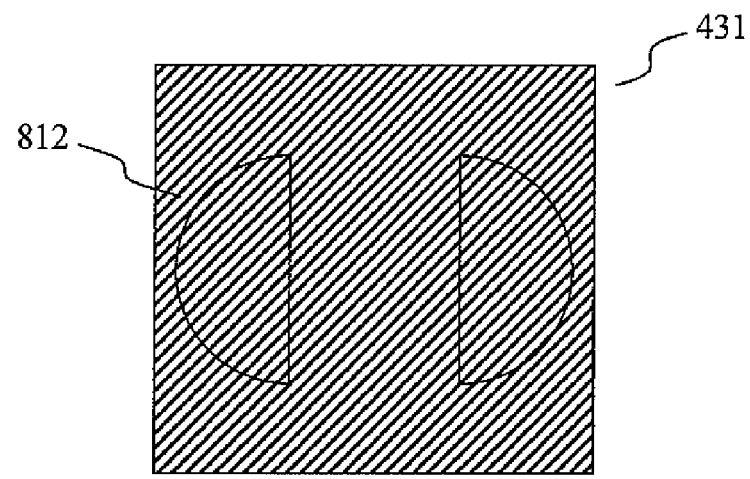
FIG. 23 is a view illustrating a diffraction grating whose groove direction is oblique to a direction in which the light flux is spread out.
Figure 24:
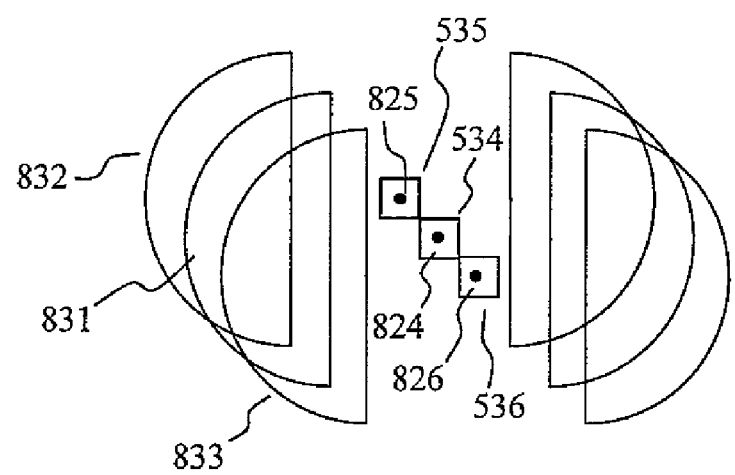
FIG. 24 is a view illustrating the light distribution on the condensing plane and an arrangement of detectors when the diffraction grating of FIG. 23 is used.

FIG. 23 illustrates a case where the groove direction of a diffraction grating 431 is oblique at 45 degrees to a direction in which the reflected light is spread out. FIG. 24 illustrates the distribution of the reflected light on the condensing plane 524. The 0th-order light from the target layer forms a spot 824, and the ±1st-order lights form spots 825 and 826 in an oblique direction. The 0th-order light of the stray light forms a light distribution as indicated by reference numeral 831, and the ±1st-order lights thereof form light distributions in the oblique direction as indicated by reference numerals 832 and 833. When the groove direction of the diffraction grating is set to be oblique to a large degree with respect to the direction in which the reflected light is spread out, the stray light approaches the spots formed by the reflected light from the target layer. This is not preferable because the stray light is more likely to enter the detector 535 or 536. It is thus desirable to set the groove direction of the diffraction grating to be substantially equal to the direction in which the reflected light is spread out.

Figure 25:
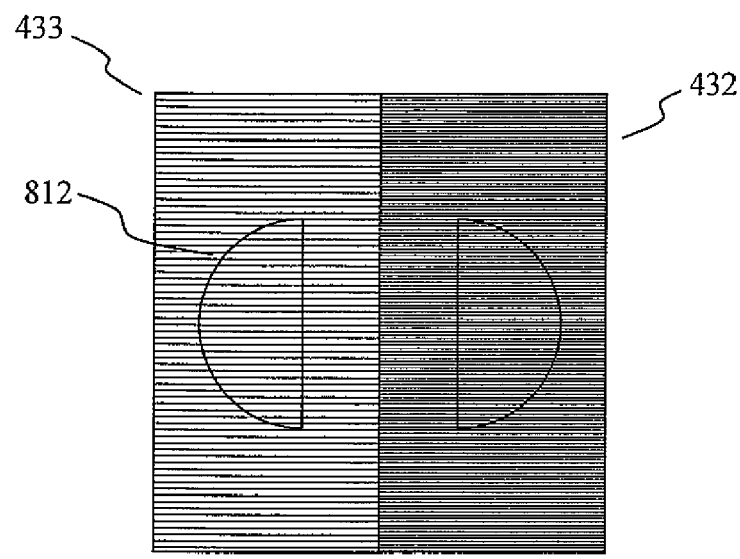
FIG. 25 is a view illustrating a diffraction grating which is divided into two.
Figure 26:
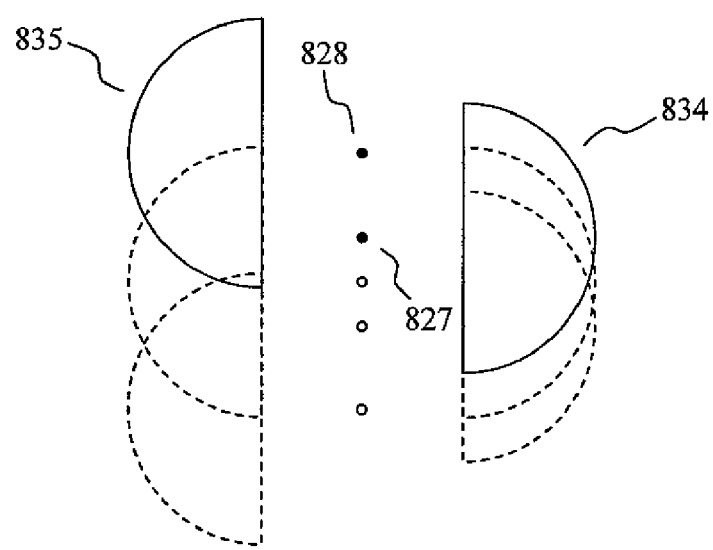
FIG. 26 is a view illustrating the light distribution on the condensing plane when the diffraction grating of FIG. 25 is used.

In an optical pickup of the present invention, an effective region of the diffraction grating is divided, to thereby enable detection of a tracking error signal and a focus error signal. Here, an example in which the diffraction grating is divided into two is briefly given. A diffraction grating which is divided into two as illustrated in FIG. 25 is inserted into the return path of the reflected lights split into two, as illustrated in FIG. 18. The diffraction grating is divided into diffraction gratings 432 and 433 on a straight line passing through the center of the optical axis and perpendicularly to the direction in which the reflected light is spread out. The groove direction of the two diffraction gratings 432 and 433 is equal to the direction in which the reflected light is spread out, and the groove pitch of the diffraction grating 432 is narrower than that of the diffraction grating 433. In this case, the light distribution, for example, as illustrated in FIG. 26 is obtained on the condensing plane 524. When the diffraction grating is blazed and only the +1st-order diffraction light is generated, the light distribution as indicated by black circles and solid lines is obtained. The reflected light from the target layer which has passed through the diffraction grating 433 forms a spot 827, and the stray light from the another layer which has passed therethrough forms a distribution as indicated by reference numeral 834. The reflected light from the target layer which has passed through the diffraction grating 432 having the narrower pitch forms a spot 828, and the stray light from the another layer which has passed therethrough forms a distribution as indicated by reference numeral 835. White circles and dotted lines in FIG. 26 indicate the light distribution obtained when the 0th-order light and the −1st-order light are generated from the diffraction grating.

As is apparent from the above, the reflected light from the target layer can be condensed at a specific position on the straight line extending in the vertical direction, and the stray light from the another layer can be excluded from the condensing position of the reflected light from the target layer. It is possible to divide a diffraction grating into a complex pattern, and it is similarly possible to condense the reflected light from the target layer on the straight line and to exclude the reflected light from the another layer, which becomes the stray light, from the straight line in the center. As a result, spots on the straight line extending in the vertical direction are individually detected, which enables the detection of signals necessary for the optical pickup without the influence of the stray light from the another layer. In the above, the distribution of the stray light is described with regard to the reflected light from the layer farther than the target layer. In the case of the layer closer than the target layer, the distribution thereof is laterally inverted. Also in this case, the stray light is not distributed in the vicinity of the condensing position of the reflected light from the target layer.

The above description is given on the assumption that the diffraction grating or the light flux splitting optical system is inserted at the position at which the reflected light from the target layer becomes the parallel light flux, but the diffraction grating or the light flux splitting optical system is not necessarily inserted into the parallel light flux. As the arrangement as illustrated in FIG. 27, a light flux splitting optical system 121 and a diffraction grating 434 may be inserted into the converging light. FIG. 27 illustrates only the reflected light from the target layer which enters the reflected light condensing lens 405. The converging light from the reflected light condensing lens 405 enters the diffraction grating 434 divided into a plurality of regions to generate the diffraction light, and the generated diffraction light is split by the light flux splitting optical system 121 to be condensed as a spot on the condensing plane 524. Even with this arrangement, it is possible to exclude the stray light from the another layer from the condensing position of the reflected light from the target layer as described above.

Figure 28:
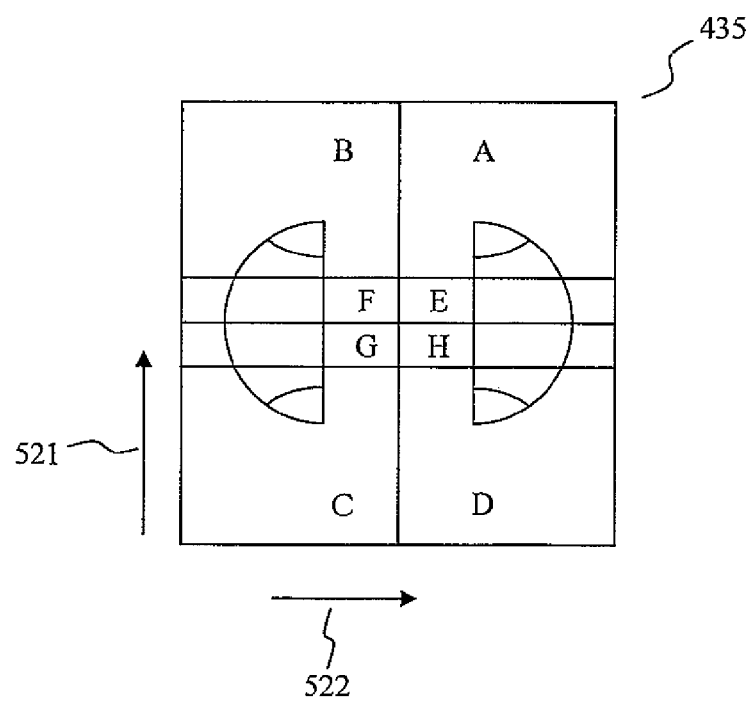
FIG. 28 is a view illustrating a divided diffraction grating.
Figure 29:
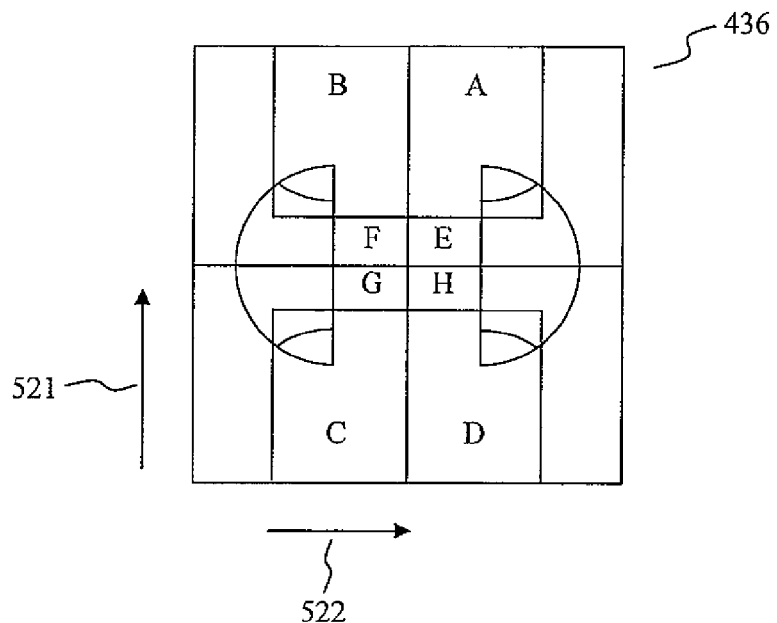
FIG. 29 is a view illustrating another divided diffraction grating.
Figure 30:
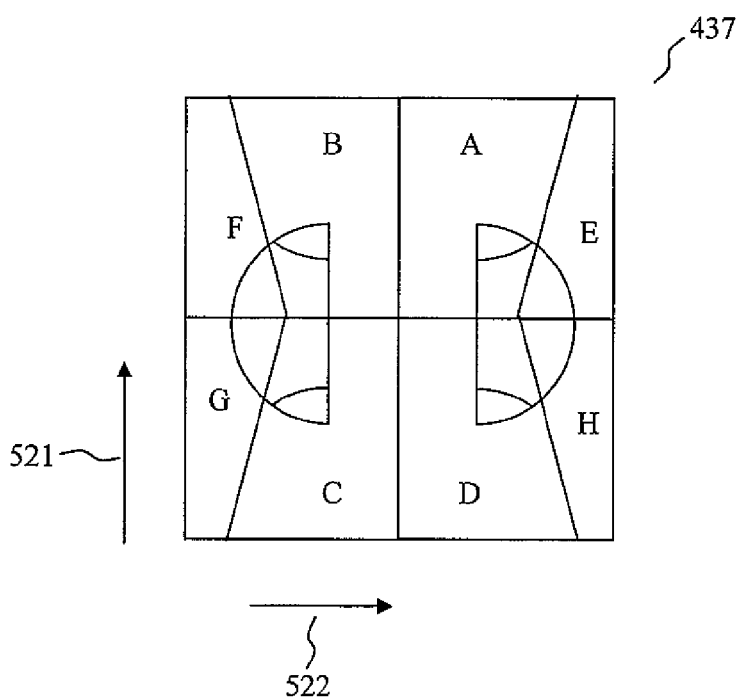
FIG. 30 is a view illustrating still another divided diffraction grating.
Figure 31:
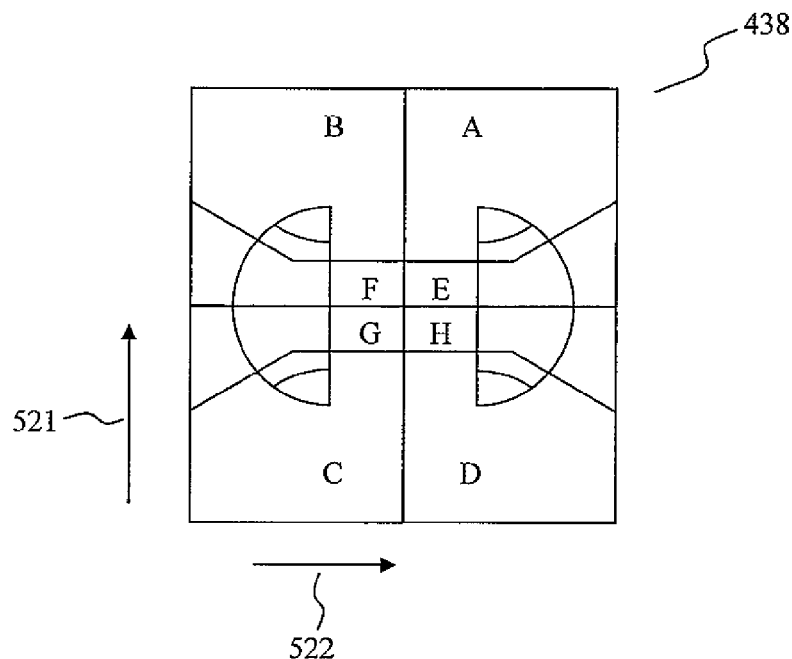
FIG. 31 is a view illustrating still another divided diffraction grating.

Next, FIGS. 28, 29, 30, 31, and 32 illustrate examples of division shapes of actually-used diffraction gratings as indicated by reference numerals 435, 436, 437, 438, and 439, respectively. A knife-edge method is used as a method of obtaining the focus error signal. The ball pattern of the reflected light from the target layer is illustrated in each of FIGS. 28, 29, 30, 31, and 32. A lateral direction corresponds to a tangential direction 522. In splitting the reflected light, the tangential in which the reflected light is spread out corresponds to the tangential direction. Fundamentally, all the diffraction gratings are divided into four parts by four-dividing lines which pass through the center of the optical axis and run in the tangential direction or the radial direction, and each of the four divided parts is further divided into a region including the ball pattern and a region not including the ball pattern symmetrically to the four-dividing lines. The regions including the ball pattern are denoted by reference symbols A, B, C, and D, and the regions not including the ball pattern are denoted by reference symbols E, F, G, and H. The diffraction grating 439 illustrated in FIG. 32 has the same fundamental structure as that of the diffraction grating 435 of FIG. 28, is provided with a band-shaped light shielding band 440 in the central part thereof, and serves to further improve an effect of eliminating the stray light from the another layer.

In the optical pickup, the objective lens is displaced in the radial direction for tracking. At this time, the stray light from the another layer is also displaced in the radial direction on the detector. In each of FIGS. 28, 29, 30, 31, and 32 described above, the reflected light is spread out in the tangential direction 522. Therefore, even when the stray light is displaced in the radial direction 521, the stray light is prevented from approaching the spot of the reflected light from the target layer. Accordingly, this splitting direction of the reflected light is strong in the displacement of the objective lens.

Figure 33:
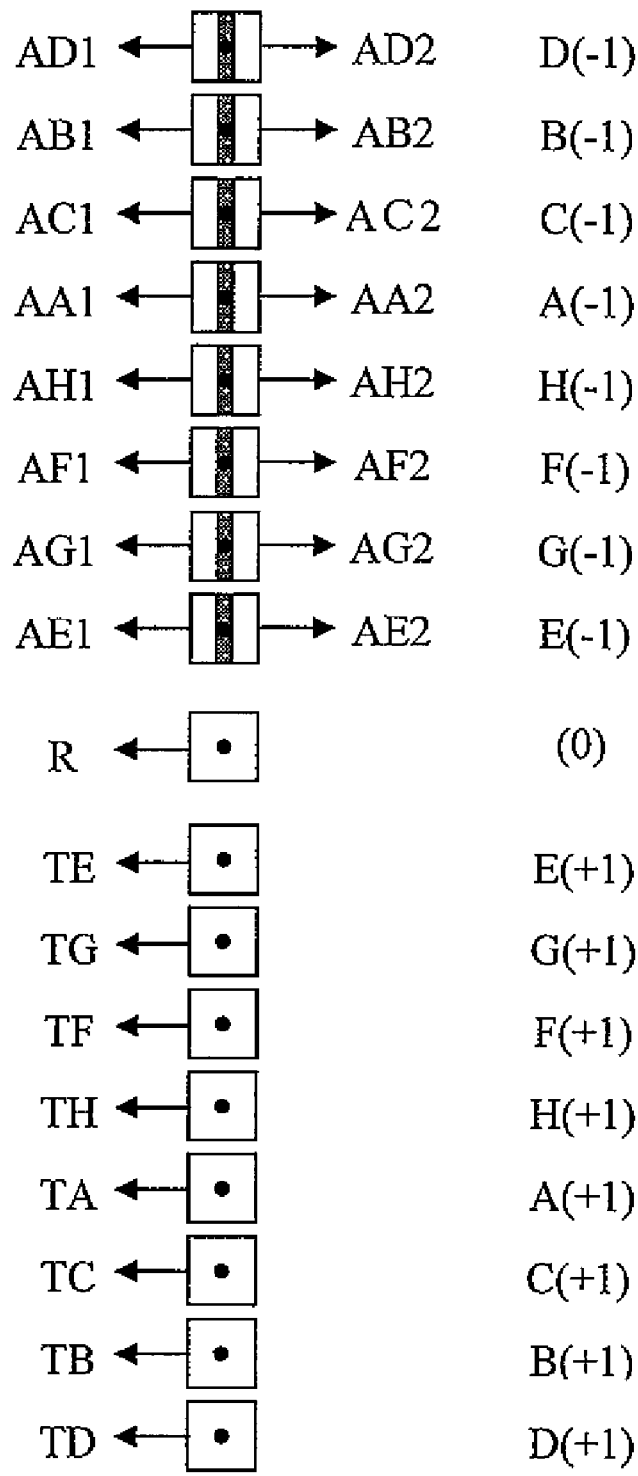
FIG. 33 is a view illustrating an arrangement of detectors.

FIG. 33 illustrates an arrangement example of detectors. In this case, a rectangular shape is used as the groove shape of the diffraction grating, and the 0th-order light and the ±1st-order lights are generated. Black circles indicate the spots of the reflected light from the target layer, and names of the diffraction lights corresponding thereto are given on a rightmost side. For example, D(−1) and E(+1) indicate the −1st-order light from the region D of the diffraction grating and the +1st-order light from the region E of the diffraction grating, respectively, and (0) indicates the 0th-order light. The groove pitch of each of the divided parts is designed so that each reflected light enters a predetermined detector. The eight detectors from the top serve to detect the focus error signal. A dark line is provided in the center of each of the eight detectors in the radial direction, and two detectors are arranged so as to sandwich the dark line.

Figure 34:
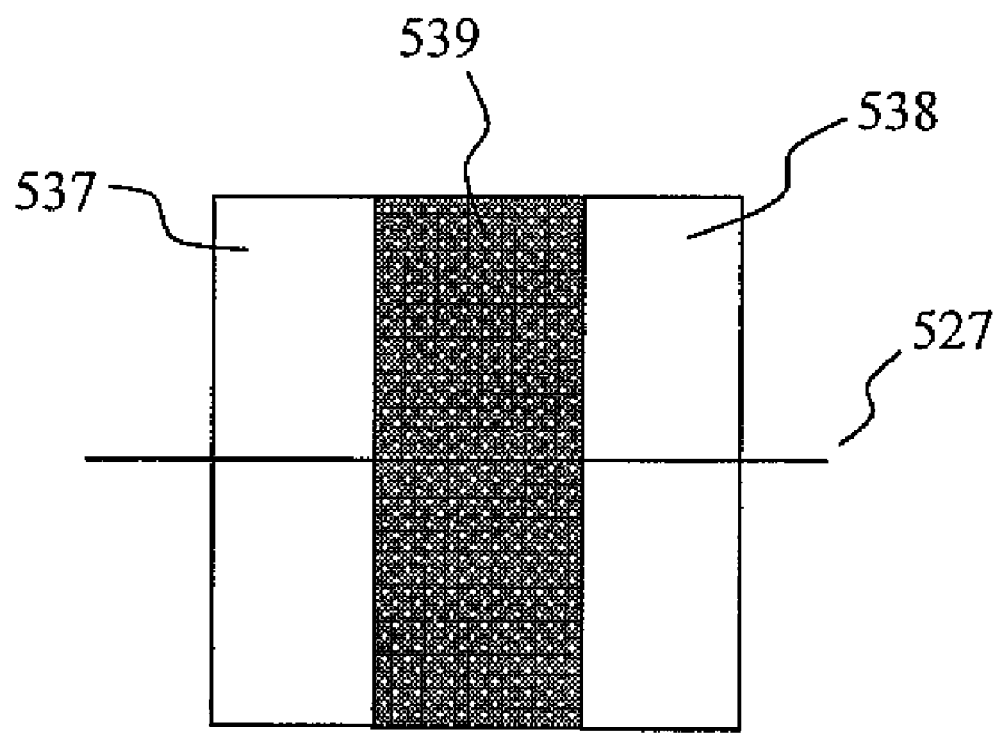
FIG. 34 is a view illustrating a change in responsivities on a dark line.
Figure 34:
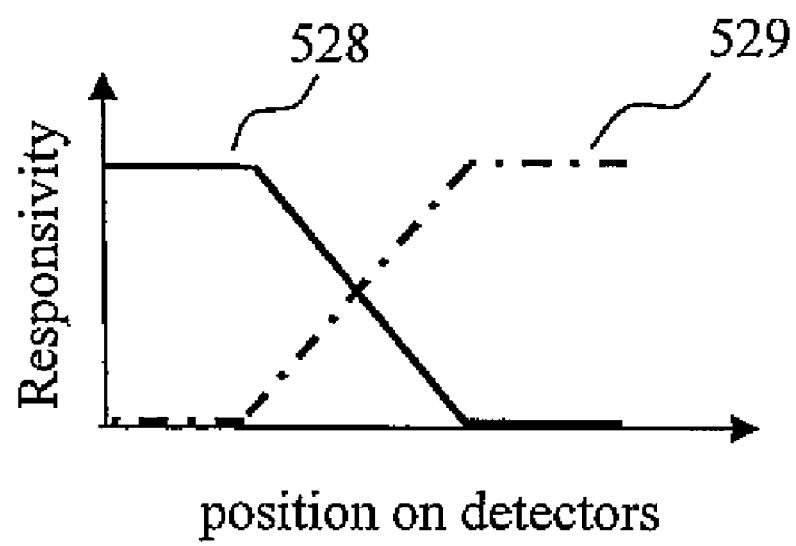

FIG. 34 illustrates a change in responsivities of two detectors 537 and 538 in a dark line region 539. An upper view in FIG. 34 illustrates the two detectors 537 and 538 and the dark line region 539 sandwiched therebetween. A lower graph in FIG. 34 shows the responsivities of the detectors 537 and 538 when a minute beam spot is moved along a straight line 527 on the respective detectors. A solid line 528 indicates the responsivity of the detector 537. The responsivity of the detector 537 gradually decreases in the dark line region 539 toward the detector 538 to reach zero on the detector 538. In addition, an alternate long and short dash line 529 indicates the responsivity of the detector 538. In this case, conversely, the responsivity of the detector 538 is higher on the detector 538, and gradually decreases toward the detector 537 to reach zero on the detector 537. The responsivity distribution thus provided in the dark line region 539 enables a smooth focus error signal to be obtained.

The influence of an intensity change of the ball pattern on the focus error signal is small if the light spot can be formed at an intermediate position of the dark line at which the responsivities are equal to each other, but, in actuality, the light spot cannot be always formed at the intermediate position due to a temperature change or insufficient adjustment. The light coming from the region A of the diffraction grating forms a light spot having the same intensity as the light coming from the region B thereof, and the light coming from the region C thereof forms a light spot having the same intensity as the light coming from the region D thereof. However, due to the intensity change of the ball pattern, the light coming from the region A does not always form a light spot having the same intensity as the light coming from the region D, and the light coming from the region B does not always form a light spot having the same intensity as the light coming from the region C. Under these conditions, when the entire spot is deviated from the center of the dark line, in a case of using a group of detectors each having the dark line in the radial direction, signals with the same light intensity, the same sensing position, and the opposite sign are generated by other detectors to cancel the change amount, and hence the balance of the tracking signal is prevented from being lost. However, in a case of using a group of detectors each having the dark line in the tangential direction, though the sensing positions in the respective detectors are the same, combinations of subtraction for signal processing are different, and hence the signals with the same light intensity cannot be cancelled. For this reason, the balance of the tracking signal is easily lost, and accurate tracking cannot be performed. Accordingly, in order to reduce the influence of the intensity change of the ball pattern on the focus error signal, it is desirable to use the detectors each having the dark line in the radial direction.

The detector in the center which detects the 0th-order light serves to output an RF signal, and eight detectors from the bottom serve to generate the tracking error signal. The groove depth of the diffraction grating is a factor which determines a light splitting ratio of the 0th-order light to the ±1st-order lights, and also is a design matter to be determined taking the intensity of the light source, noise in the electrical system, and the like into consideration.

A symbol indicated by the arrow given to each detector in FIG. 33 denotes an output name of the corresponding detector. A focus error signal AF is expressed as follows.

$$AF=(AA1-AA2)+(AE1-AE2)+(AH1-AH2)+(AD1-AD2)-\{(AB1-AB2)+(AF1-AF2)+(AG1-AG2)+(AC1-AC2)\}$$

A tracking error signal TE is expressed as follows.

$$TE=\{(TA+TB)-(TC+TD)\}-k\{(TE+TF)-(TG+TH)\}$$

The RF signal is expressed as follows.

$$RF=R$$

Figure 35:
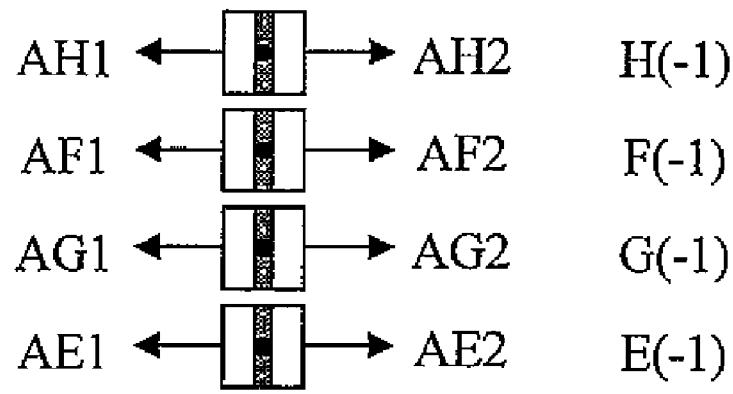
FIG. 35 is a view illustrating another arrangement of the detectors.
Figure 35:
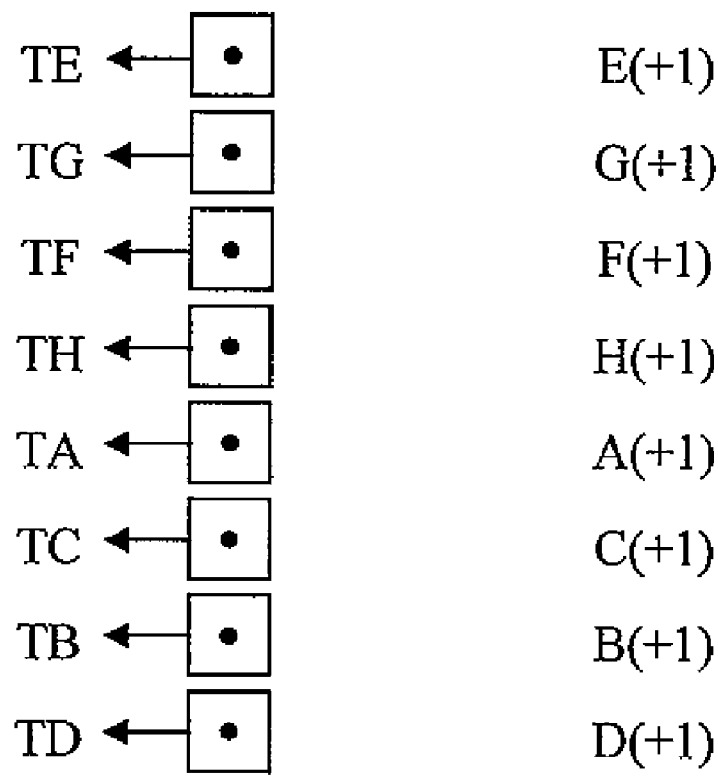

In an arrangement example of detectors illustrated in FIG. 35, the number of detectors for detecting the focus error signal is reduced. In addition, the 0th-order light is prevented from being generated by adjusting the groove depth of the diffraction grating. That is, the regions E, F, G, and H of the diffraction grating in each of FIGS. 28, 29, 30, and 31 have a rectangular groove shape and generate only the −1st-order lights, whereas the regions A, B, C, and D of the diffraction grating are blazed and generate only the +1st-order light. Because the 0th-order light in the center for the RF signal, which is illustrated in FIG. 33, is not generated, the RF signal is generated based on the tracking error signal. In this case, the focus error signal AF is expressed as follows.

$$AF=(AE1-AE2)+(AH1-AH2)-\{(AF1-AF2)+(AG1-AG2)\}$$

The RF signal is expressed as follows.

$$RF=TA+TB+TC+TD+TE+TF+TG+TH$$

The tracking error signal is the same as that in the case of FIG. 33.

Figure 36:
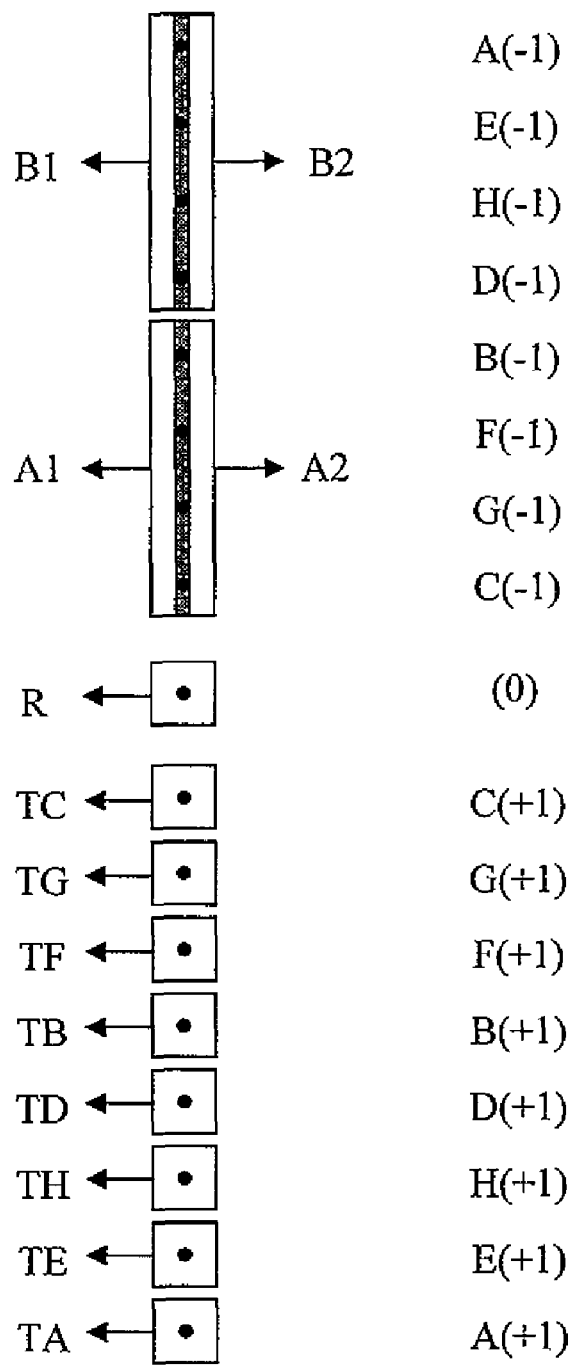
FIG. 36 is a view illustrating still another arrangement of the detectors.

In FIG. 36, the number of detectors for detecting the focus error signal which are illustrated in FIG. 33 is further reduced. For this reason, the length of the detectors in the vertical direction is made longer to detect four spots at the same time. In order to realize this structure, signals with the same signal polarity which are generated due to defocusing are collectively detected by the same detector. In this case, the focus error signal AF is expressed as follows.

$$AF=B1-B2-(A1-A2)$$

The tracking error signal and the RF signal are the same as those in the case of FIG. 33.

Figure 37:
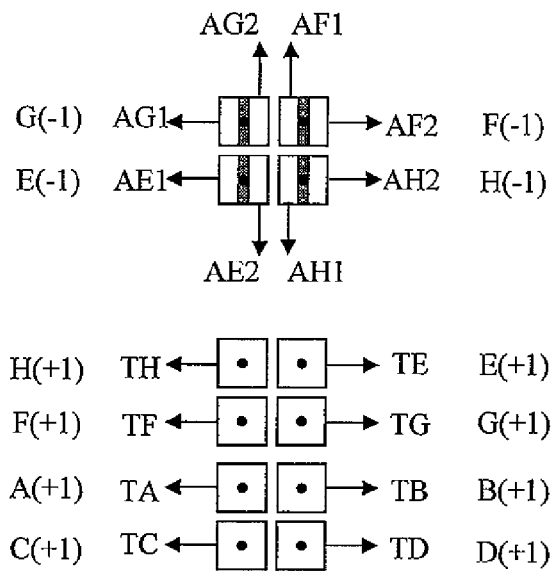
FIG. 37 is a view illustrating still another arrangement of the detectors.

In an arrangement of detectors in FIG. 37, the arrangement in FIG. 35 is changed into two lines. When the stray light from the another layer is largely excluded in the lateral direction, the influence of the stray light is small even with the detectors being arranged in two lines. The spot position of the reflected light from the target layer can be controlled by adjusting the tilt and the pitch of the grooves of the diffraction grating in the tangential direction. The signals are generated in the same manner as in FIG. 35. Because the detectors can be provided concentratedly in the center, the pitch of the diffraction grating does not need to be finely made. This makes the manufacture of the diffraction grating easier to enable the use of the diffraction grating with fewer errors.

The diffraction light generated by the diffraction grating may become a higher-order light than the above-mentioned ±1st-order lights and enter other detectors to cause an adverse influence in some cases. Especially when the light spots are arranged in one line, a third-order light at a spot near the optical axis may enter a detector located at a position far from the optical axis. In this case, it is possible to adopt an arrangement of spots for reducing the adverse influence, for example, an arrangement which causes a signal of the detector which is far from the optical axis and is adversely affected to have the same phase. In the arrangement of detectors in two lines in FIG. 37, the tilts of the diffraction gratings are different from each other, and hence there is an advantage that the higher-order diffraction light is less likely to enter the other detectors.

Figure 32:
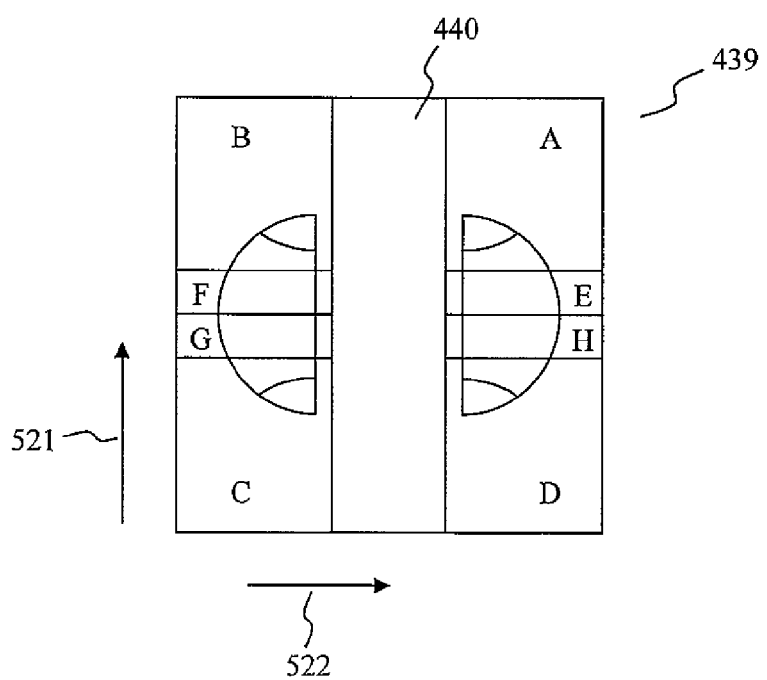
FIG. 32 is a view illustrating still another divided diffraction grating.
Figure 38:
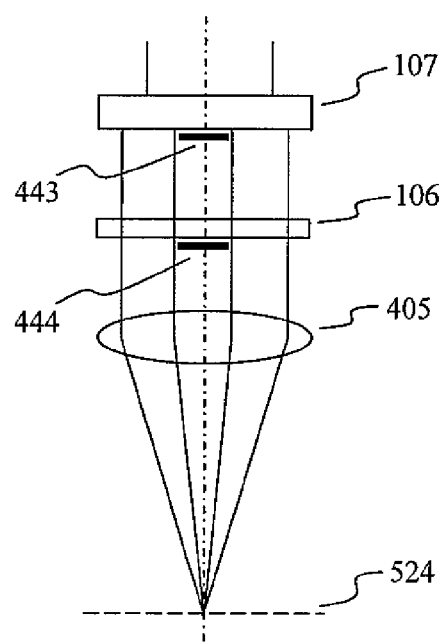
FIG. 38 is a view illustrating an optical system in which light shielding bands are provided on light exit surfaces of a light flux splitting optical system and a diffraction grating.

FIG. 38 illustrates a method of further eliminating the stray light from the another layer. It is assumed that the reflected light from the target layer enters an optical system formed by combining a light flux splitting optical system 107 and a diffraction grating 106, and is condensed by the reflected light condensing lens 405. FIG. 32 illustrates the method of shielding the central part of the diffraction grating from light. On the other hand, in FIG. 38, a band-shaped light shielding plate 443 is provided in a region in which an amount of light is lost after the reflected light from the target layer spreads out in the tangential direction, on a light exit surface of the light flux splitting optical system 107. A light shielding band 444 has the same function as that of the light shielding region 440 of the diffraction grating in FIG. 32. The light shielding bands are provided at the light exit positions of both of the light flux splitting optical system and the diffraction grating, whereby the stray light from the another layer can be eliminated before reaching the detectors. As a result, it is possible to increase an efficiency of eliminating the stray light from the detectors.

Next, embodiments of the present invention are described.

EMBODIMENT 1

Figure 1:
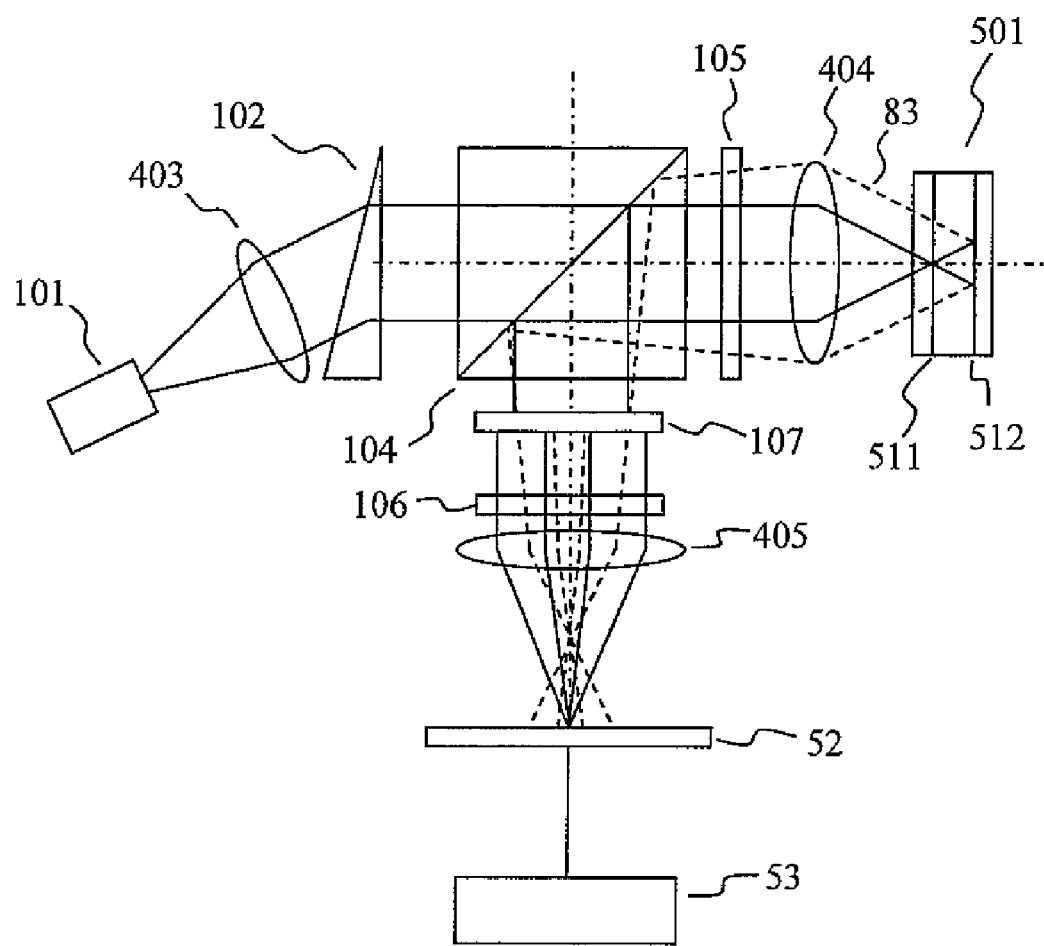
FIG. 1 is a view illustrating an example of an optical system of an optical pickup device according to the present invention.

FIG. 1 is a view illustrating an example of an optical system of an optical pickup device according to the present invention. The laser light emitted from a semiconductor laser 101 is collimated into a circular beam by a collimator lens 403 and a triangular prism 102, and then is transmitted through a polarization beam splitter 104. Subsequently, the beam is converted into a circular polarization light by a λ/4 plate 105, and is focused by an objective lens 404 onto a multi-layer disc 501 rotated by a rotation mechanism. In FIG. 1, a double-layer disc is illustrated, but the present invention is not limited to the double-layer disc, and can be applied to a multi-layer disc having three or more layers. A readout target layer (target layer) is denoted by reference numeral 511, and a reflected light is generated from a position of the smallest spot of the laser light on the readout target layer 511. A reflected light 83 is generated also from an adjacent layer 512, and becomes a stray light which causes a crosstalk.

The reflected light from the multi-layer disc, which contains the stray light, returns to the objective lens 404, and is converted by the λ/4 plate 105 into a straight polarization light traveling in a direction orthogonal to the traveling direction of the original polarization light. Therefore, the converted light is reflected by the polarization beam splitter 104, and travels toward the light flux splitting optical system 107 to be split into two light fluxes. The optical system illustrated in FIG. 9, 10, or 13 is used as the light flux splitting optical system 107. After that, the two light fluxes pass through the diffraction grating 106, and the split spots are detected by a detector 52 which is disposed on the condensing plane of the reflected light from the target layer. The diffraction grating illustrated in FIG. 28, 29, 30, 31, or 32 can be used as the diffraction grating 106. Further, the detectors which are arranged correspondingly to the respective diffraction gratings as illustrated in FIG. 33, 35, 36, or 37 may be used as the detector 52. The detection region of the detector 52 is set to be a position which the reflected light from the adjacent layer 512 does not enter. Signals from the optical detector 52 are processed by a signal processing circuit 53, and the AF signal and the TE signal for controlling the light spot position and the RF signal as a data signal are formed.

In a case where a ROM disc without grooves is read, a DPD (Differential Phase Detection) method can be used as a tracking method. This method is relatively not affected by the stray light from the another layer. In this case, the following signals are generated based on the signals from the detector:

$T1=(TA+TE)+(TC+TG)$; and $T2=(TB+TF)+(TD+TH)$.

Then, the differential phase between the signals T1 and T2 is detected to form the tracking error signal TE. The RF signal and the AF signal are formed in the same manner as in the case of the disc with grooves.

EMBODIMENT 2

Figure 2:
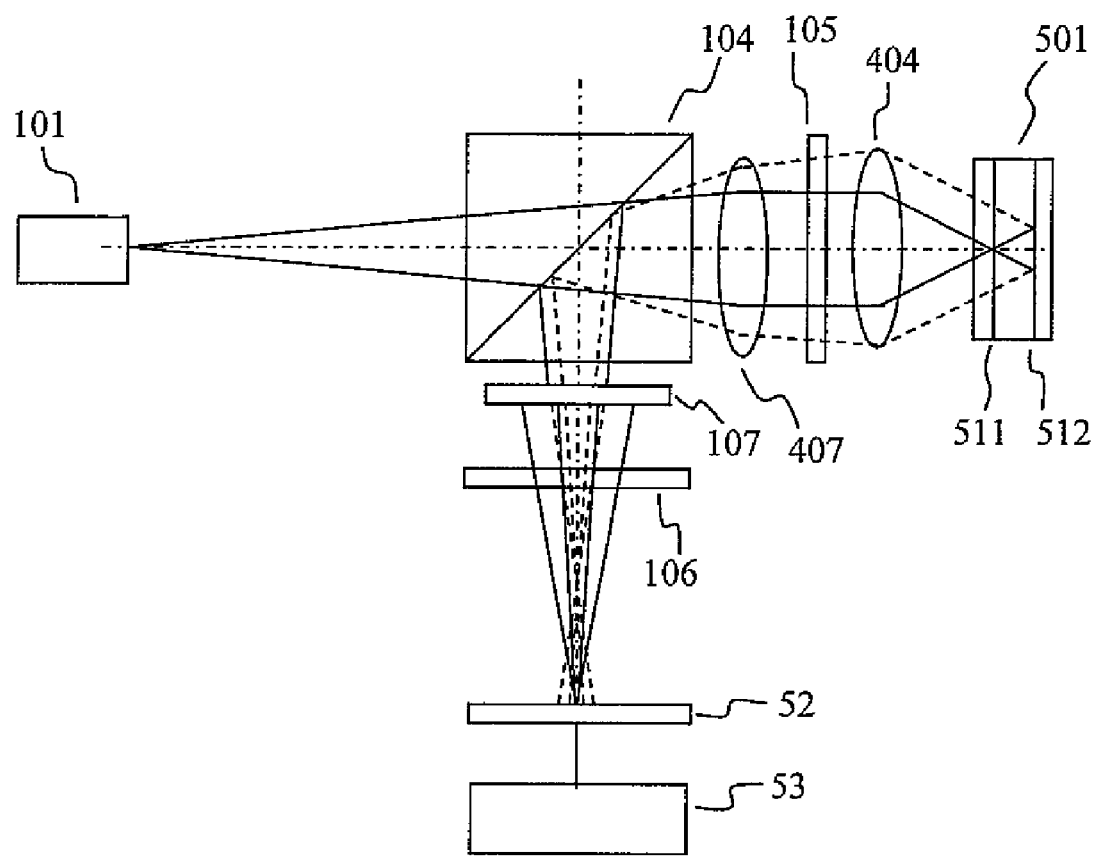
FIG. 2 is a view illustrating another example of the optical system of the optical pickup device according to the present invention.

FIG. 2 is a view illustrating another example of the optical system of the optical pickup device according to the present invention. Compared with Embodiment 1, in this embodiment, the triangular prism is omitted, and the polarization beam splitter 104 is disposed on the semiconductor laser 101 side with respect to a collimator lens 407. Accordingly, the laser light emitted from the semiconductor laser 101, which is in a divergent state, is transmitted through the polarization beam splitter 104, and then is collimated by the collimator lens 407. In Embodiment 1, the polarization beam splitter 104 is disposed between the collimator lens 403 and the objective lens 404, and hence the reflected light condensing lens 405 is required. On the other hand, in Embodiment 2, as illustrated in FIG. 2, the light beam reflected by the readout target layer 511 of the multi-layer disc 501 becomes a converging light after passing through the collimator lens 407, and hence the condensing lens is not required. As a result, an effect of reducing the number of components can be obtained.

The light flux splitting optical system 107 and the diffraction grating 106 are disposed within the converging light. The element illustrated in FIG. 13 in which the tilt of the light exit surface is adjusted can be used as the light flux splitting optical system 107. In addition, the diffraction grating illustrated in one of FIGS. 28 to 32 can be used as the diffraction grating 106.

This embodiment not only can provide the effect of reducing the number of components but also can be effective in downsizing because the light flux splitting optical system and the diffraction grating can be disposed within the converging light.

EMBODIMENT 3

Figure 3:
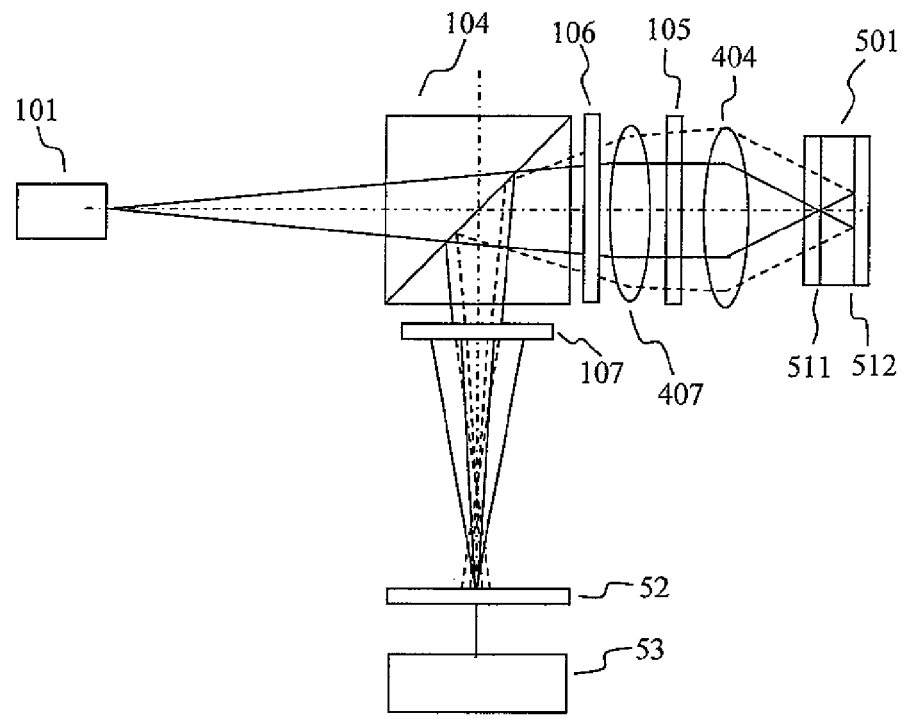
FIG. 3 is a view illustrating still another example of the optical system of the optical pickup device according to the present invention.
Figure 4:
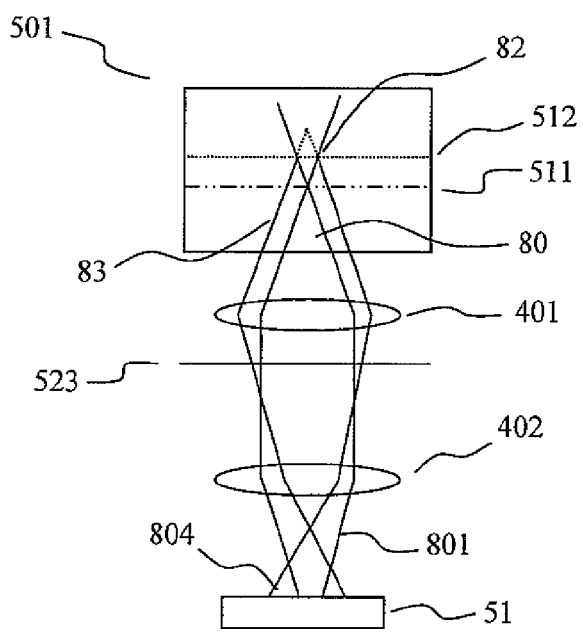
FIG. 4 is a view illustrating an influence of a reflected light from another layer.
Figure 5:
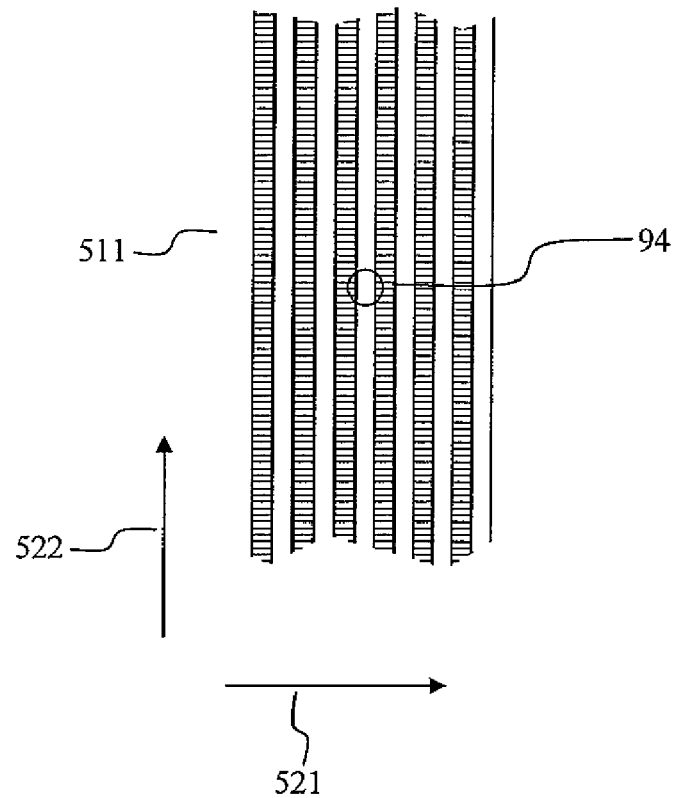
FIG. 5 is a view illustrating a state where a light ray irradiates a recording surface with grooves formed thereon.
Figure 6:
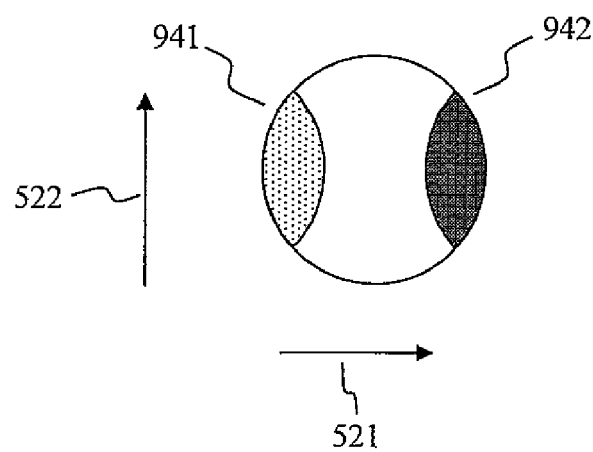
FIG. 6 is a view illustrating a ball pattern of a reflected light from an optical disc.
Figure 7:
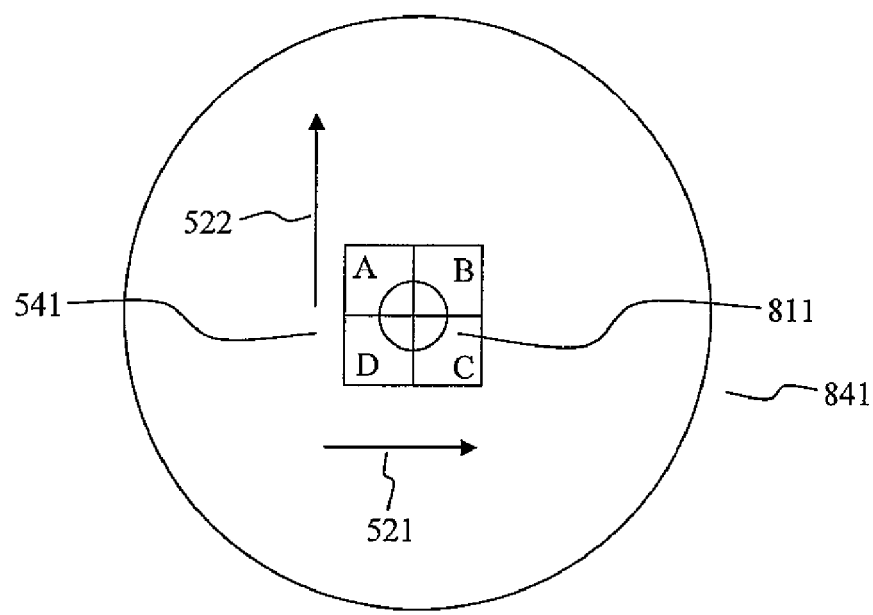
FIG. 7 is a view illustrating a shape of an optical detector, a position of a light spot of the reflected light from the optical disc, and a spread of the reflected light from the another layer.
Figure 8:
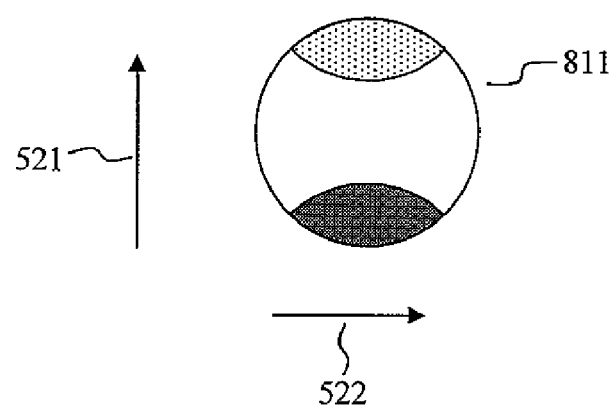
FIG. 8 is a view illustrating a ball pattern on the optical detector.

FIG. 3 is a view illustrating still another example of the optical system of the optical pickup device according to the present invention. Embodiment 3 is different from Embodiment 2 in that the diffraction grating 106 is disposed between the polarization beam splitter 104 and the collimator lens 407. In this case, both the original light and the return light are transmitted through the diffraction grating 106. Accordingly, the diffraction grating 106 has a polarization dependency. Therefore, when the original light which travels in a polarization direction toward the multi-layer optical disc 501 enters the diffraction grating 106, the diffraction grating 106 does not exert a diffraction effect on the light transmitted therethrough. On the other hand, the diffraction grating 106 exerts the diffraction effect on the light which returns from the multi-layer disc 501, passes through the λ/4 plate 105, and travels in a polarization direction orthogonal to the polarization direction of the original light. This method is effective in downsizing of the optical pickup. When the detectors have the same size, the distance, between the diffraction grating 106 and the detector 52 can be larger than that in the arrangement of FIG. 2, and hence the diffraction grating having a pitch larger than that of the diffraction grating used in FIG. 2 can be used. When a focal length of the collimator lens 407 is made shorter for downsizing, it is required to make the pitch of the diffraction grating smaller. However, because the pitch of the diffraction grating is formed by optical lithography, the minimum possible pitch thereof is limited. The pitch of the diffraction grating reaches its limit in the arrangement of FIG. 2, whereas there may be a case where the pitch thereof does not exceed its limit in the optical pickup having the structure of this embodiment. As a result, the arrangement of this embodiment enables further downsizing.

EMBODIMENT 4

Figure 39:
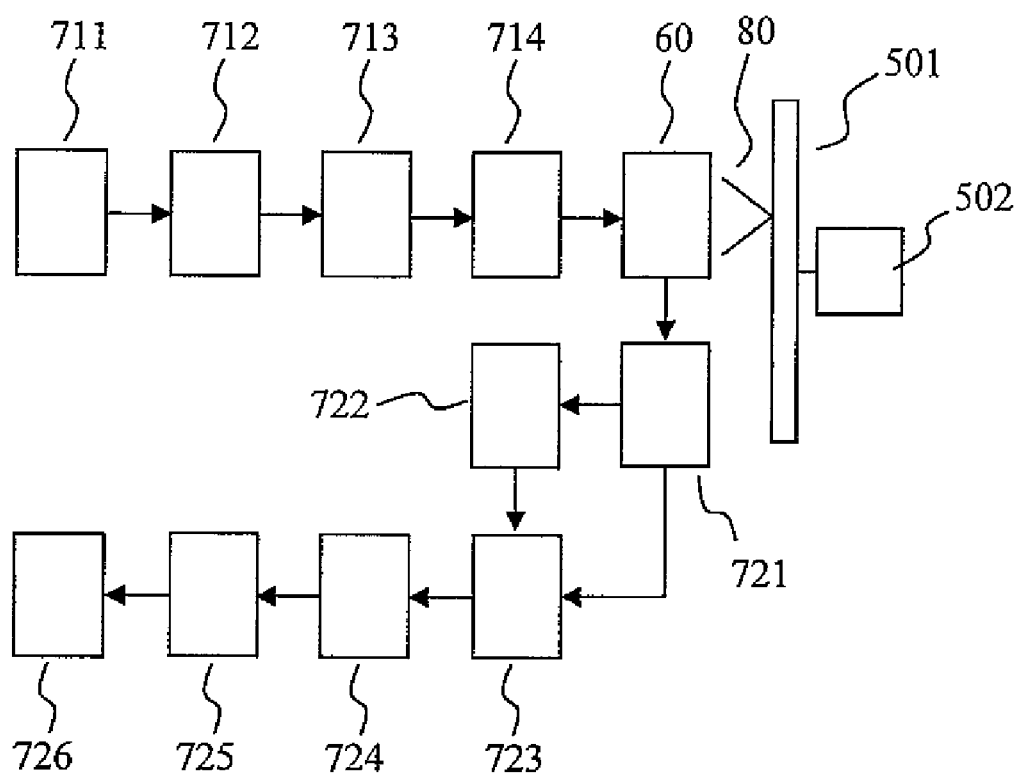
FIG. 39 is a view illustrating an example of an optical disc drive device which uses the optical pickup device according to the present invention.

FIG. 39 illustrates an embodiment of an optical disc drive device which uses an optical pickup capable of eliminating an influence of a multi-layer. Circuits 711 to 714 serve to record data onto the multi-layer optical disc 501. The error correction coding circuit 711 adds an error correction code to the data. The record coding circuit 712 modulates the data by a 1-7PP method. The record compensation circuit 713 generates a pulse for writing suited to a mark length. Based on the generated pulse train, the semiconductor laser drive circuit 714 drives a semiconductor laser provided within an optical pickup 60, to thereby modulate a laser light 80 emitted from an objective lens. A phase-change film is formed on the optical disc 501 which is rotary-driven by a motor 502. After the phase-change film is heated by the laser light, the phase-change film becomes an amorphous state in a case of being subjected to rapid cooling, and becomes a crystalline state in a case of being subjected to slow cooling. These two states have different refractive indexes, which enables a mark formation. In a writing state, high frequency superposition which reduces coherency of the laser light is not performed, and hence the reflected light from the adjacent layer and the reflected light from the target layer easily interfere with each other. For this reason, in a case where measures to reduce fluctuations in tracking error signal are not taken, there occurs a trouble that the tracking is deviated or data in an adjacent track is deleted. In this embodiment, any one of the optical pickups described in Embodiments 1 to 3 is adopted as the optical pickup 60, and hence the trouble of the tracking does not occur in the multi-layer disc.

Circuits 721 to 726 serve to read out data. The equalizer circuit 721 improves a signal-to-noise ratio in the vicinity of a shortest mark length. The signal is inputted to the PLL circuit 722, and a clock is extracted therefrom. In addition, the A/D converter circuit 723 digitizes the data signal processed by the equalizer circuit 721 at a timing of the extracted clock. The PRML (Partial Response Maximum Likelihood) signal processing circuit 724 performs Viterbi decoding. The record decoding circuit 725 decodes the data based on a modulation rule of the 1-7PP method, and the error correction circuit 726 restores the data.

According to the present invention, the stray light from the another layer can be eliminated, and the accuracy of tracking or focusing can be increased. Therefore, the accuracy of writing into a disc can be improved. Further, noise in the RF signal can be reduced, and it is therefore possible to maintain the quality of the readout data signal with fewer errors.

DESCRIPTION OF SYMBOLS

| 52 | detector |
|---|---|
| 53 | signal processing circuit |
| 101 | semiconductor laser |
| 104 | polarization beam splitter |
| 105 | λ/4 plate |
| 106 | diffraction grating |
| 107 | light flux splitting optical system |
| 404 | objective lens |
| 405 | reflected light condensing lens |

-continued

DESCRIPTION OF SYMBOLS

| 435 to 439 | diffraction grating |
|---|---|
| 501 | multi-layer disc |
| 524 | condensing plane |
| 811 | reflected light spot |
| 812 | split reflected light from target layer |
| 815 | stray light |
| 841 | light spot of reflected light from adjacent layer |

What is claimed is:

1. An optical pickup device comprising:
a laser light source;
an irradiation optical system which condenses a laser light from the laser light source onto one recording layer of a multi-layer optical information storage medium; and
a detection optical system which detects a reflected light reflected by the one recording layer of the multi-layer optical information storage medium, wherein:
the detection optical system comprises:
a light flux splitting optical system which parallel splits the reflected light from the one recording layer to both sides of an optical axis so that light fluxes obtained after parallel splitting the reflected light do not pass through the optical axis before reaching a condensing plane;
a diffraction grating which is divided into a plurality of regions having different diffraction directions;
a reflected light condensing lens which focuses the reflected light split by the light flux splitting optical system; and
a detector which is provided on the condensing plane of the reflected light from the one recording layer, the reflected light being focused by the reflected light condensing lens; and
a sensing region of the detector is provided in a region which is not irradiated with a reflected light from another recording layer different from the one recording layer.

2. The optical pickup device according to claim 1, wherein the light flux splitting optical system splits the reflected light in a tangential direction.

3. The optical pickup device according to claim 1, wherein:
a 0th-order light and ±1st-order lights of the reflected light from the one recording layer, which are diffracted by the diffraction grating, are arranged in one line in a radial direction with the optical axis being centered; and
the sensing region of the detector is provided at a position corresponding to each of the diffraction lights.

4. The optical pickup device according to claim 1, wherein:
a 0th-order light from the one recording layer, which is diffracted by the diffraction grating, is substantially zero;
1st-order lights from the one recording layer, which are diffracted by the diffraction grating, are arranged in one line in a radial direction; and
the sensing region of the detector is provided at a position corresponding to each of the diffraction lights.

5. The optical pickup device according to claim 1, wherein:
a 0th-order light from the one recording layer, which is diffracted by the diffraction grating, is substantially zero;
±1 st-order lights from the one recording layer, which are diffracted by the diffraction grating, are arranged in a plurality of lines in a radial direction; and the sensing region of the detector is provided at a position corresponding to each of the diffraction lights.

6. The optical pickup device according to claim 1, wherein:
the diffraction grating is divided into eight regions having the different diffraction directions;
the eight regions are provided symmetrically to a straight line in a radial direction and a straight line in a tangential direction, both the straight lines intersecting the optical axis; and
four of the eight regions comprise a ball pattern and a remaining four of the eight regions do not comprise the ball pattern.

7. The optical pickup device according to claim 6, wherein sensing regions of the detector which detect a focus error signal are arranged in the tangential direction so as to sandwich a dark line.

8. The optical pickup device according to claim 1, wherein the light flux splitting optical system comprises a transparent member including:
a light incident surface formed of first two planes, the first two planes having, as a first ridge line, a straight line which perpendicularly intersects the optical axis and forming the same angle with respect to the optical axis; and
a light exit surface formed of second two planes, the second two planes having, as a second ridge line, a straight line which perpendicularly intersects the optical axis and forming the same angle with respect to the optical axis.

9. The optical pickup device according to claim 1, wherein the diffraction grating is a polarization-dependent diffraction grating, and is disposed within an optical path which is common to the irradiation optical system and the detection optical system.

10. An optical pickup device comprising:
a laser light source;
an irradiation optical system which condenses a laser light from the laser light source onto one recording layer of a multi-layer optical information storage medium; and
a detection optical system which detects a reflected light reflected by the one recording layer of the multi-layer optical information storage medium, wherein:
the detection optical system comprises:
a reflected light condensing lens which condenses the reflected light from the one recording layer onto a detector;
a light flux splitting optical system which splits the reflected light from the one recording layer to both sides of an optical axis so that light fluxes obtained after splitting the reflected light do not pass through the optical axis before reaching a condensing plane formed by the reflected light condensing lens, the light flux splitting optical system being provided between the detector and the reflected light condensing lens; and
a diffraction grating which is divided into a plurality of regions having different diffraction directions; and
a sensing region of the detector is provided in a region which is not irradiated with a reflected light from another recording layer different from the one recording layer.

11. The optical pickup device according to claim 10, wherein the light flux splitting optical system splits the reflected light in a tangential direction.

12. The optical pickup device according to claim 10, wherein:
a 0th-order light and ±1st-order lights of the reflected light from the one recording layer, which are diffracted by the diffraction grating, are arranged in one line in a radial direction with the optical axis being centered; and
the sensing region of the detector is provided at a position corresponding to each of the diffraction lights.

13. The optical pickup device according to claim 10, wherein:
a 0th-order light from the one recording layer, which is diffracted by the diffraction grating, is substantially zero;
±1st-order lights from the one recording layer, which are diffracted by the diffraction grating, are arranged in one line in a radial direction; and
the sensing region of the detector is provided at a position corresponding to each of the diffraction lights.

14. The optical pickup device according to claim 10, wherein:
a 0th-order light from the one recording layer, which is diffracted by the diffraction grating, is substantially zero;
±1st-order lights from the one recording layer, which are diffracted by the diffraction grating, are arranged in a plurality of lines in a radial direction; and
the sensing region of the detector is provided at a position corresponding to each of the diffraction lights.

15. The optical pickup device according to claim 10, wherein:
the diffraction grating is divided into eight regions having the different diffraction directions;
the eight regions are provided symmetrically to a straight line in a radial direction and a straight line in a tangential direction, both the straight lines intersecting the optical axis; and
four of the eight regions comprise a ball pattern and a remaining four of the eight regions do not comprise the ball pattern.

16. The optical pickup device according to claim 15, wherein sensing regions of the detector which detect a focus error signal are arranged in the tangential direction so as to sandwich a dark line.

17. The optical pickup device according to claim 10, wherein the light flux splitting optical system comprises a transparent member including:
a light incident surface formed of first two planes, the first two planes having, as a first ridge line, a straight line which perpendicularly intersects the optical axis and forming the same angle with respect to the optical axis; and
a light exit surface formed of second two planes, the second two planes having, as a second ridge line, a straight line which perpendicularly intersects the optical axis and forming the same angle with respect to the optical axis.

18. The optical pickup device according to claim 10, wherein the diffraction grating is a polarization-dependent diffraction grating, and is disposed within an optical path which is common to the irradiation optical system and the detection optical system.

* * * * *